United States Patent
Lewis et al.

(10) Patent No.: US 11,095,723 B2
(45) Date of Patent: Aug. 17, 2021

(54) MAINTAINING SESSION IDENTIFIERS ACROSS MULTIPLE WEBPAGES FOR CONTENT SELECTION

(71) Applicant: Google LLC, Mountain View, CA (US)

(72) Inventors: Justin Lewis, Mountain View, CA (US); Thomas Price, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/606,501

(22) PCT Filed: Jun. 15, 2018

(86) PCT No.: PCT/US2018/037940
§ 371 (c)(1),
(2) Date: Oct. 18, 2019

(87) PCT Pub. No.: WO2019/040162
PCT Pub. Date: Feb. 28, 2019

(65) Prior Publication Data
US 2020/0128086 A1 Apr. 23, 2020

Related U.S. Application Data

(63) Continuation of application No. PCT/US2017/047843, filed on Aug. 21, 2017.

(51) Int. Cl.
*G06F 15/173* (2006.01)
*H04L 29/08* (2006.01)
(Continued)

(52) U.S. Cl.
CPC .......... *H04L 67/146* (2013.01); *G06F 16/958* (2019.01); *G06F 16/9554* (2019.01); *H04L 67/22* (2013.01)

(58) Field of Classification Search
CPC ..... H04L 67/146; H04L 67/22; G06F 16/958; G06F 16/9554
(Continued)

(56) References Cited

U.S. PATENT DOCUMENTS 7,162,436 B1 * 1/2007 Eckel, Jr. ............ G06Q 20/102
705/14.67
7,633,955 B1 * 12/2009 Saraiya ................ H04L 49/356
370/395.31

(Continued)

OTHER PUBLICATIONS

The International Search Report and The Written Opinion for application No. PCT/US2017/047843 dated Oct. 24, 2017.
(Continued)

*Primary Examiner* — Thuong Nguyen
(74) *Attorney, Agent, or Firm* — Foley & Lardner LLP

(57) ABSTRACT

Systems and methods for maintaining session identifiers across multiple webpages for content selection are described herein. A server can generate a session identifier corresponding to the client device for use in selecting content to be served across the information resources of a content publisher. The server can then receive, from the client device, a request for instructions to insert into a header of an information resource for selecting a content provider. The server can determine that the request includes the session identifier that matches the one generated for a previous request. The server can obtain a parameter value for each content provider with the session identifier. The server can select a content provider using the parameter values. The server can provide a script to the client device for the header. The script can be configured to cause the client device to obtain a content item from the selected content provider to insert into the information resource.

18 Claims, 8 Drawing Sheets

(51) Int. Cl.
  *G06F 16/958* (2019.01)
  *G06F 16/955* (2019.01)
(58) Field of Classification Search
  USPC ............... 709/224, 203, 204, 246, 219, 217;
    370/252, 230; 705/30, 57
  See application file for complete search history.

(56) References Cited

U.S. PATENT DOCUMENTS

| | | | | |
|---|---|---|---|---|
| 2002/0103855 A1* | 8/2002 | Chatani | ................. | G06Q 30/02 |
| | | | | 709/203 |
| 2003/0023754 A1* | 1/2003 | Eichstadt | .............. | G06F 16/954 |
| | | | | 709/246 |
| 2007/0240121 A1* | 10/2007 | Spangler | ................ | G06Q 10/04 |
| | | | | 717/127 |
| 2009/0213844 A1* | 8/2009 | Hughston | ........... | H04M 3/4872 |
| | | | | 370/352 |
| 2012/0036051 A1* | 2/2012 | Sachson | ................. | G06Q 40/12 |
| | | | | 705/30 |
| 2012/0101890 A1* | 4/2012 | Matsushita | ........ | G06Q 30/0224 |
| | | | | 705/14.25 |
| 2013/0024514 A1* | 1/2013 | Feldhahn | ............... | G06Q 10/10 |
| | | | | 709/204 |
| 2013/0232335 A1* | 9/2013 | King | ..................... | H04L 63/062 |
| | | | | 713/155 |
| 2013/0247142 A1* | 9/2013 | Nishizawa | ............ | G06F 21/604 |
| | | | | 726/1 |
| 2013/0333024 A1* | 12/2013 | Takenouchi | .......... | H04L 9/0662 |
| | | | | 726/19 |
| 2014/0344405 A1* | 11/2014 | Sachson | .................. | H04W 4/21 |
| | | | | 709/217 |
| 2016/0105240 A1* | 4/2016 | Yang | .................. | H04Q 11/0067 |
| | | | | 398/68 |
| 2016/0127440 A1* | 5/2016 | Gordon | ................ | H04L 65/601 |
| | | | | 709/219 |
| 2017/0012824 A1* | 1/2017 | Goyal | ................... | H04L 45/304 |
| 2018/0227780 A1* | 8/2018 | Rey | ....................... | H04W 24/08 |
| 2019/0138711 A1* | 5/2019 | Yaffe | ....................... | G06F 21/51 |
| 2019/0213462 A1* | 7/2019 | McDonald | ............ | G06K 19/07 |

OTHER PUBLICATIONS

The International Search Report and The Written Opinion of the International Searching Authority for application No. PCT/US2018/037940 dated Aug. 16, 2018.
Examination Report for EP Appln. Ser. No. 20161285.0 dated Apr. 19, 2021 (4 pages).
International Preliminary Report on Patentability for PCT Appln. Ser. No. PCT/US2017/047843 dated Mar. 5, 2020 (10 pages).
International Preliminary Report on Patentability for PCT Appln. Ser. No. PCT/US2018/037940 dated Mar. 5, 2020 (10 pages).
Extended European Search Report for EP Appln. Ser. No. 20161285.0 dated Mar. 30, 2020 (6 pages).
Harvey, Kathleen, "How Google Analytics Uses Cookies to Identify Users", Aug. 17, 2017, XP055411414 (6 pages).
Office Action for CN Appln. Ser. No. 201880009460.7 dated Mar. 27, 2020 (13 pages).

* cited by examiner

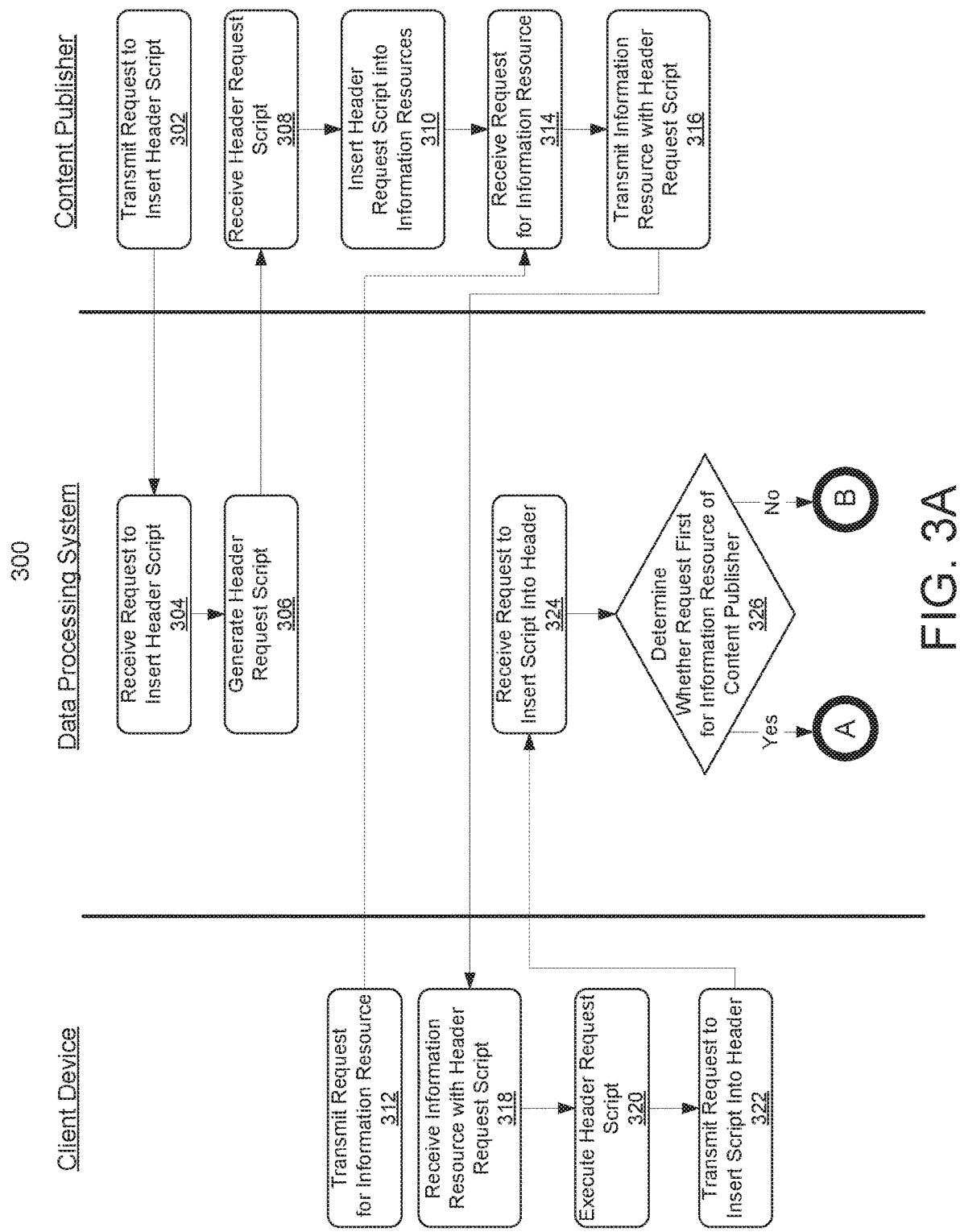

MAINTAINING SESSION IDENTIFIERS ACROSS MULTIPLE WEBPAGES FOR CONTENT SELECTION

RELATED APPLICATIONS

The present application is a national stage application under 35 U.S.C. § 371 of International Patent Application No. PCT/US2018/037940, entitled "Maintaining Session Identifiers Across Multiple Webpages for Content Selection," filed Jun. 15, 2018, which claims the benefit of and priority to International Patent Application No. PCT/US2017/047843, entitled "Maintaining Session Identifiers Across Multiple Webpages for Content Selection," filed Aug. 21, 2017, each of which is incorporated by reference in its entirety.

BACKGROUND

In a computer networked environment such as the Internet, entities such as people or companies provide information for public display on web pages or other online documents. The documents can include information provided by the entities via a computing device for display on the Internet. Content can also be provided by other entities for display on the documents together with the information provided by the entities. Thus, a user viewing a document can access the information that is the subject of the document, as well as third party content that may or may not be related to the subject matter of the document.

SUMMARY

At least one aspect is directed to a method of maintaining session identifiers across multiple webpages for content selection. A data processing system having one or more processors can generate, responsive to receiving from a client device a first request for first instructions to insert into a first header of a first information resource of a content publisher for selecting one of a plurality of content providers, a session identifier corresponding to the client device for use in selecting content to be served across a plurality of information resources of the content publisher. The session identifier may be provided to the plurality of content providers. The data processing system can subsequently receive, from the client device, a second request for second instructions to insert into a second header of a second information resource for selecting one of the plurality of content providers. The second request can include the session identifier. The data processing system can determine that the second request includes the session identifier that matches the session identifier generated responsive to receiving the first request. The data processing system can obtain, responsive to determining that the second request includes the session identifier, a respective content selection parameter value for each content provider of the plurality of content providers using the session identifier. The data processing system can select a content provider from the plurality of content providers using the plurality of content selection parameter values obtained from the plurality of content providers. The data processing system can provide a content retrieval script to the client device to insert into the second header of the second information resource. The content retrieval script can be configured to cause the client device to obtain a content item from the selected content provider to insert into the second information resource.

In some implementations, the data processing system can receive, from the client device, the first request for first instructions to insert into the first header of the first information resource of the content publisher for selecting one of a plurality of content providers. In some implementations, the data processing system can provide the session identifier to the plurality of content providers permitted to insert content items into the plurality of information resources of the content publisher. In some implementations, the data processing system can provide, responsive to receiving the first request, a parameter value retrieval script to the client device to insert into the first header of the first information resource. The parameter value retrieval script can be configured to permit the corresponding content provider to access state data stored on the client device using the session identifier and to retrieve. The parameter value retrieval script can be configured to cause the client device to obtain a first plurality of content selection parameter values from each content provider of the plurality of content providers. Each of the first plurality of content selection parameters can be used to select a first content item to insert onto the first information resource.

In some implementations, the data processing system can receive, subsequent to receiving the second request, a third request for third instructions to insert into a third header of a third information resource for selecting one of the plurality of content providers. The third request can include the session identifier. In some implementations, the data processing system can determine, based on a random value generated by a pseudo-random number generator, that the third header to be inserted with a parameter value retrieval script instead of the content retrieval script. In some implementations, the data processing system can provide, responsive to receiving the third request, the parameter value retrieval script to the client device to insert into the third header of the third information resource. The parameter value retrieval script can be configured to permit the corresponding content provider to access state data stored on the client device using the session identifier and to retrieve. The parameter value retrieval script can be configured to cause the client device to obtain a third plurality of content selection parameter values from each content provider of the plurality of content providers. Each of the third content selection parameters may be used to select a first content item to insert onto the third information resource.

In some implementations, the data processing system can identify a content provider address corresponding to the content provider selected using the plurality of content selection parameter values obtained from the plurality of content providers. In some implementations, the data processing system can generate the content retrieval script including instructions to cause the client device to obtain the content item using the content provider address. In some implementations, providing the content retrieval script can further include providing the content retrieval script to the client device. Receipt of the content retrieval script can cause the client device to send a request for content to the content provider address specified in the content retrieval script and to subsequently receive the content item from the content provider.

In some implementations, the data processing system can determine, responsive to receiving the first request, that the client device has not previously accessed the plurality of information resources of the content publisher. In some implementations, generating the session identifier can further include generating the session identifier, responsive to determining that the client device has not previously accessed the plurality of information resources.

In some implementations, generating the session identifier can further include providing the session identifier to each content provider of the plurality of content providers. Receipt of the session identifier can cause the corresponding content provider to store the session identifier as corresponding to the client device for use in providing content to be served across the plurality of information resources of the content publisher. The receipt of the session identifier can cause the corresponding content provider to transmit, to the data processing system, a content selection parameter used by the client device to select a first content item to insert onto a first information resource at the client device.

In some implementations, providing the content retrieval script to the client device can further include providing the content retrieval script to the client device. Receipt of the content retrieval script can cause the client device to insert the content retrieval script into the second header of the second information resource. Receipt of the content retrieval script can cause the client device to execute the second header of the second information resource including the content retrieval script prior to execution of a remainder of the second information resource. Receipt of the content retrieval script can cause the client device to send, in executing the content retrieval script of the second header, a request for content to the selected content provider. Receipt of the content retrieval script can cause the client device to obtain, subsequent to sending the request for content, the content item from the selected content provider. Receipt of the content retrieval script can cause the client device to insert, responsive to obtaining of the content item, the content item into the remainder of the second information resource.

In some implementations, obtaining the respective content selection parameter value for each content provider of the plurality of content providers using the session identifier can further include obtaining a conditional sequence of content selection parameter values for each content provider using the session identifier. The conditional sequence of content selection parameters can specify the respective content selection parameter value for the second information resource. The conditional sequence of content selection parameters can specify one of a second respective content selection parameter based on selection of the corresponding content provider for a third information resource of the content publisher subsequent to the second information resource or a third respective content selection parameter based on non-selection of the corresponding content provider for the third information resource.

In some implementations, the data processing system can receive, subsequent to receiving the second request, a third request for third instructions to insert into a third header of the third information resource for selecting one of the plurality of content providers, the third request including the session identifier. In some implementations, the data processing system can select, for the third information resource, the content provider from the plurality of content providers using the conditional sequence of content selection parameter values obtained from the plurality of content providers. In some implementations, the data processing system can provide a second content retrieval script to the client device to insert into the third header of the third information resource. The content retrieval script can be configured to cause the client device to obtain a second content item from the selected content provider to insert into the third information resource.

In some implementations, the data processing system can receive, subsequent to receiving the second request, a third request for third instructions to insert into a third header of a third information resource for selecting one of the plurality of content providers. The third request can include the session identifier. In some implementations, the data processing system can determine, based on a random value generated by a pseudo-random number generator, that the conditional sequence of content selection parameter values is not to be used in selecting one of the plurality of content providers for the third information resource. In some implementations, the data processing system can obtain, responsive to determined that the conditional sequence of content selection parameter values is not to be used, a new content selection parameter value for each content provider of the plurality of content providers using the session identifier. In some implementations, the data processing system can select one of the content provider or a second content provider from the plurality of content providers using the plurality of new content selection parameter values obtained from the plurality of content providers. In some implementations, the data processing system can provide a second content retrieval script to the client device to insert into the third header of the third information resource. The content retrieval script can be configured to cause the client device to obtain a third content item from the selected content provider to insert into the third information resource.

At least one aspect is directed to a system for maintaining session identifiers across multiple webpages for content selection. A data processing system having one or more processors can generate, responsive to receiving from a client device a first request for first instructions to insert into a first header of a first information resource of a content publisher for selecting one of a plurality of content providers, a session identifier corresponding to the client device for use in selecting content to be served across a plurality of information resources of the content publisher. The session identifier may be provided to the plurality of content providers. The data processing system can subsequently receive, from the client device, a second request for second instructions to insert into a second header of a second information resource for selecting one of the plurality of content providers. The second request can include the session identifier. The data processing system can determine that the second request includes the session identifier that matches the session identifier generated responsive to receiving the first request. The data processing system can obtain, responsive to determining that the second request includes the session identifier, a respective content selection parameter value for each content provider of the plurality of content providers using the session identifier. The data processing system can select a content provider from the plurality of content providers using the plurality of content selection parameter values obtained from the plurality of content providers. The data processing system can provide a content retrieval script to the client device to insert into the second header of the second information resource. The content retrieval script can be configured to cause the client device to obtain a content item from the selected content provider to insert into the second information resource.

In some implementations, the data processing system can receive, from the client device, the first request for first instructions to insert into the first header of the first information resource of the content publisher for selecting one of a plurality of content providers. In some implementations, the data processing system can provide the session identifier to the plurality of content providers permitted to insert content items into the plurality of information resources of the content publisher. In some implementations, the data processing system can provide, responsive to receiving the first request, a parameter value retrieval script to the client device to insert into the first header of the first information resource. The parameter value retrieval script can be configured to permit the corresponding content provider to access state data stored on the client device using the session identifier and to retrieve. The parameter value retrieval script can be configured to cause the client device to obtain a first plurality of content selection parameter values from each content provider of the plurality of content providers. Each of the first plurality of content selection parameters can be used to select a first content item to insert onto the first information resource.

In some implementations, the data processing system can receive, subsequent to receiving the second request, a third request for third instructions to insert into a third header of a third information resource for selecting one of the plurality of content providers. The third request can include the session identifier. In some implementations, the data processing system can determine, based on a random value generated by a pseudo-random number generator, that the third header to be inserted with a parameter value retrieval script instead of the content retrieval script. In some implementations, the data processing system can provide, responsive to receiving the third request, the parameter value retrieval script to the client device to insert into the third header of the third information resource. The parameter value retrieval script can be configured to permit the corresponding content provider to access state data stored on the client device using the session identifier and to retrieve. The parameter value retrieval script can be configured to cause the client device to obtain a third plurality of content selection parameter values from each content provider of the plurality of content providers. Each of the third content selection parameters may be used to select a first content item to insert onto the third information resource.

In some implementations, the data processing system can identify a content provider address corresponding to the content provider selected using the plurality of content selection parameter values obtained from the plurality of content providers. In some implementations, the data processing system can generate the content retrieval script including instructions to cause the client device to obtain the content item using the content provider address. In some implementations, the data processing system can provide the content retrieval script to the client device. Receipt of the content retrieval script can cause the client device to send a request for content to the content provider address specified in the content retrieval script and to subsequently receive the content item from the content provider.

In some implementations, the data processing system can determine, responsive to receiving the first request, that the client device has not previously accessed the plurality of information resources of the content publisher. In some implementations, the data processing system can generate the session identifier, responsive to determining that the client device has not previously accessed the plurality of information resources.

In some implementations, the data processing system can provide the session identifier to each content provider of the plurality of content providers. Receipt of the session identifier can cause the corresponding content provider to store the session identifier as corresponding to the client device for use in providing content to be served across the plurality of information resources of the content publisher. The receipt of the session identifier can cause the corresponding content provider to transmit, to the data processing system, a content selection parameter used by the client device to select a first content item to insert onto a first information resource at the client device.

In some implementations, the data processing system can provide the content retrieval script to the client device. Receipt of the content retrieval script can cause the client device to insert the content retrieval script into the second header of the second information resource. Receipt of the content retrieval script can cause the client device to execute the second header of the second information resource including the content retrieval script prior to execution of a remainder of the second information resource. Receipt of the content retrieval script can cause the client device to send, in executing the content retrieval script of the second header, a request for content to the selected content provider. Receipt of the content retrieval script can cause the client device to obtain, subsequent to sending the request for content, the content item from the selected content provider. Receipt of the content retrieval script can cause the client device to insert, responsive to obtaining of the content item, the content item into the remainder of the second information resource.

In some implementations, the data processing system can obtain a conditional sequence of content selection parameter values for each content provider using the session identifier. The conditional sequence of content selection parameters can specify the respective content selection parameter value for the second information resource. The conditional sequence of content selection parameters can specify one of a second respective content selection parameter based on selection of the corresponding content provider for a third information resource of the content publisher subsequent to the second information resource or a third respective content selection parameter based on non-selection of the corresponding content provider for the third information resource.

In some implementations, the data processing system can receive, subsequent to receiving the second request, a third request for third instructions to insert into a third header of the third information resource for selecting one of the plurality of content providers, the third request including the session identifier. In some implementations, the data processing system can select, for the third information resource, the content provider from the plurality of content providers using the conditional sequence of content selection parameter values obtained from the plurality of content providers. In some implementations, the data processing system can provide a second content retrieval script to the client device to insert into the third header of the third information resource. The content retrieval script can be configured to cause the client device to obtain a second content item from the selected content provider to insert into the third information resource.

In some implementations, the data processing system can receive, subsequent to receiving the second request, a third request for third instructions to insert into a third header of a third information resource for selecting one of the plurality of content providers. The third request can include the session identifier. In some implementations, the data processing system can determine, based on a random value generated by a pseudo-random number generator, that the conditional sequence of content selection parameter values is not to be used in selecting one of the plurality of content providers for the third information resource. In some implementations, the data processing system can obtain, responsive to determined that the conditional sequence of content selection parameter values is not to be used, a new content selection parameter value for each content provider of the plurality of content providers using the session identifier. In some implementations, the data processing system can select one of the content provider or a second content provider from the plurality of content providers using the plurality of new content selection parameter values obtained from the plurality of content providers. In some implementations, the data processing system can provide a second content retrieval script to the client device to insert into the third header of the third information resource. The content retrieval script can be configured to cause the client device to obtain a third content item from the selected content provider to insert into the third information resource.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIGS. 3A-3C are flow diagrams depicting a method of maintaining session identifiers across multiple webpages for content selection, according to an illustrative implementation;

DETAILED DESCRIPTION

Figure 1:
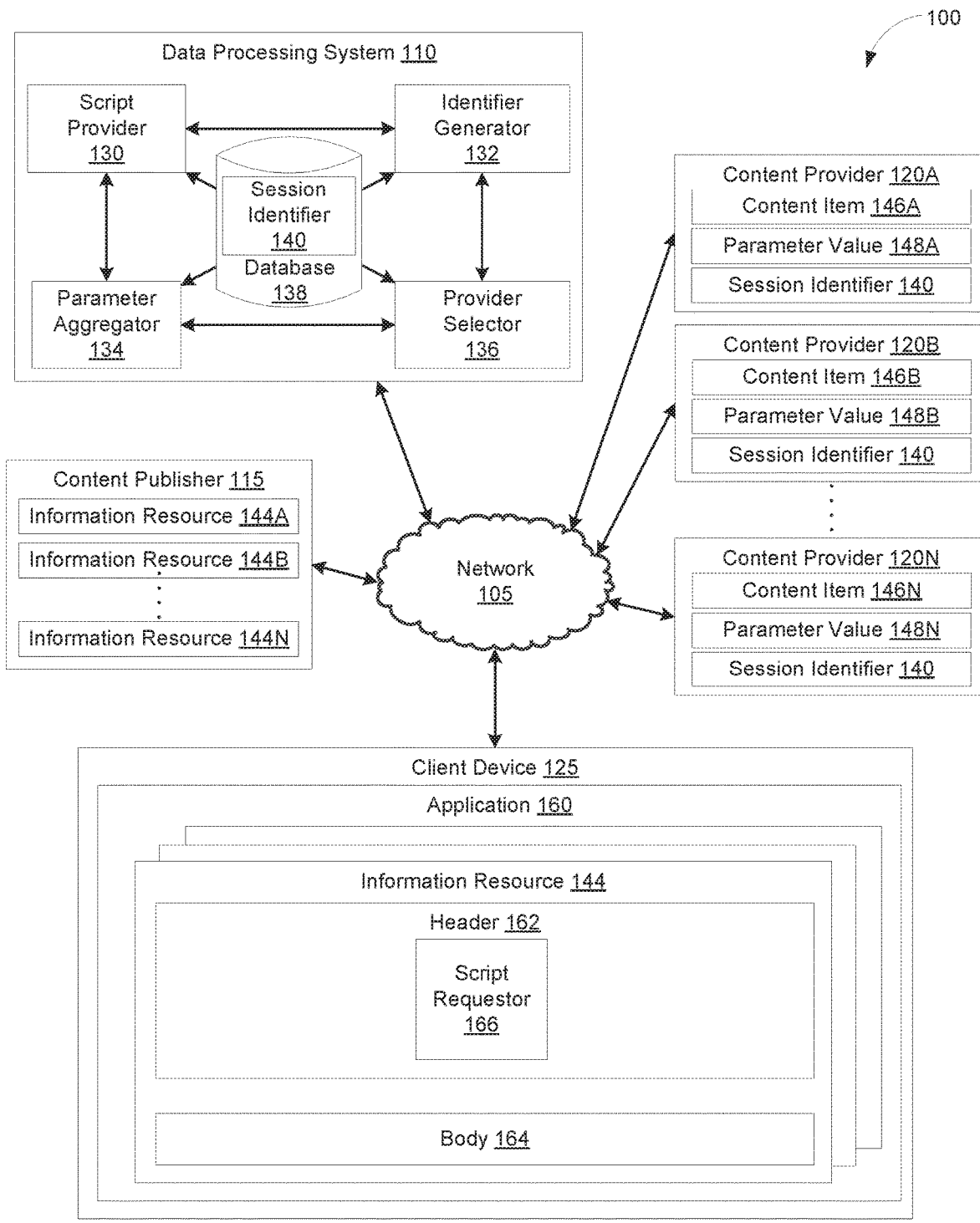
FIG. 1 is a block diagram depicting a computer networked environment for maintaining session identifiers across multiple webpages for content selection, according to an illustrative implementation.

Following below are more detailed descriptions of various concepts related to, and implementations of, methods, apparatuses, and systems of maintaining session identifiers across multiple webpages for content selection. The various concepts introduced above and discussed in greater detail below may be implemented in any of numerous ways, as the described concepts are not limited to any particular manner of implementation.

In current header content selection techniques, a website publisher may publish a webpage including slots for inserting supplementary content provided by a content provider other than the website publisher. In such techniques, the website publisher may insert a script (in the form of JAVASCRIPT) into a header of a webpage. When the webpage is loaded, the script can trigger the client device to contact one or more content providers to provide supplementary information for the purposes of selecting content for inclusion in the webpage (e.g., relevancy scores, predicted interaction rates, bid values, etc., or any combination thereof), instead of sending a request for supplementary content directly to a single content selection server. Upon receipt of responses from the content providers, the script may allow the client device to select a content provider to provide supplementary content using the code of webpage itself. Once the content provider whose content item is to be inserted into the webpage is identified, the client device itself may send a request for content to the content selection server using the request script further down the code of the webpage. The content selection server may send a request for content to the identified content provider, and the content provider in turn may send a content item to the client device.

One issue that may arise from such techniques may include introduction of additional network latency, as the client device loads multiple webpages of the same website. This may be because the inclusion of content provider tags into the header script may lead to repeated request calls of each content provider.

To address this issue, a wrapper may be added into the header of the webpage code to transfer some of the steps to the content selection server. The wrapper may include code from each content provider to allow each content provider to read the respective cookie(s) on the client device, in accordance with header content selection techniques.

With the first request, the wrapper may include a session identifier for the client device along with a request to the content provider for content selection parameter values. The session identifier may be generated by the content selection server for the content providers. The content provider can in turn associate the session identifier with the cookie for the client device.

As the client device visits other webpages of the website, for subsequent requests, the content selection server can send requests to the content providers, rather than the client device making the individual requests to the content providers. In this manner, latency may be reduced as the number of calls is lowered. Also, the calls between the content selection server and the content providers may be server-to-server calls, and typically tend to be faster than client-to-server calls (typically taking a few hundred milliseconds or less), and this further reduces latency. In contrast, the client device sending requests to the multiple content providers may take multiple seconds (e.g., multiple seconds). Upon receipt of the request from the content selection server, the content provider may identify the corresponding client device from the session identifier. The wrapper may also switch between the standard header content selection technique and the proposed technique to confirm reduction in latency and increase in interaction rates with the content item selected.

Another problem that may arise from header content selection techniques may include inaccuracy of selection parameter values for selecting supplementary content, as the client device loads multiple webpages of the same website. Selection parameter values for supplementary content included into the header script may be specified ahead of time. Over time, these selection parameter values may lose accuracy, leading to content items being selected (or not) that would otherwise be not selected had such header content selection techniques not been used.

To resolve this challenge, a script may be provided in the header of the webpage code with a chain of selection parameter values for supplementary content for not only the current webpage but also subsequent ones. The chain of selection parameter values may specify conditional selection parameter values. For example, the chain may specify the selection parameter values for the content for a second webpage of the website, if a content item of the content provider had been selected for the first webpage. In this manner, latency may be reduced, as the client device does not send requests to fetch selection parameter values from content providers.

This schema may, however, lead to inaccuracies in content selection parameter values over time. In order to reduce inaccuracies, the script may switch between using the chain of selection parameter values and the fetching of selection parameter values from the content provider. The content selection server may calculate the offset between the chain of suggestions and the fetched selection parameter values. Using the offset, the server can train a machine learning model to determine when to select the chain of selection parameter values versus the fetched selection parameter values.

Referring now to FIG. 1, depicted is a block diagram of one implementation of an environment 100 for maintaining session identifiers across multiple webpages for content selection. The environment 100 may include at least one data processing system 110 connected to at least one content publisher 115, one or more content providers 120A-N, and/or at least one client device 125 via the network 105. Each of the data processing system 110, the at least one content publisher 115, the one or more content providers 120A-N, and the client device 125 may include at least one processor and a memory, each of which are discussed in more detail below in connection with FIG. 5.

The network 105 can include computer networks such as the Internet local, wide, metro or other area networks, intranets, satellite networks, other computer networks such as voice or data mobile phone communication networks, and combinations thereof. The data processing system 110 of the system 100 can communicate via the network 105, for instance with at least one content provider 115 and the one or more content providers 120A-N and at least one client device 125. The network 105 may be any form of computer network that relays information between the client device 125, data processing system 110, and one or more content sources, such as web servers, amongst others. In some implementations, the network 105 may include the Internet and/or other types of data networks, such as a local area network (LAN), a wide area network (WAN), a cellular network, a satellite network, or other types of data networks. The network 105 may also include any number of computing devices (e.g., computers, servers, routers, network switches, etc.) that are configured to receive and/or transmit data within the network 105. The network 105 may further include any number of hardwired and/or wireless connections. The client device 125 may communicate wirelessly (e.g., via WiFi, cellular, radio, etc.) with a transceiver that is hardwired (e.g., via a fiber optic cable, a CAT5 cable, etc.) to other computing devices in the network 105. The client device 125 may also communicate wirelessly with the computing devices of the network 105 via a proxy device (e.g., a router, network switch, or gateway).

The data processing system 110 can include at least one processor and a memory, i.e., a processing circuit. The memory stores processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The data processing system 110 can include one or more computing devices or servers that can perform various functions. In some implementations, the data processing system can include a content placement system configured to host auctions. In some implementations, the data processing system 110 does not include the content placement system but is configured to communicate with the content placement system via the network 105.

The content publisher 115 can include servers or other computing devices operated by a content publishing entity to provide one or more information resources 144 (e.g., webpages) (generally referred to as information resource 144) including primary content for display at the client device 125 via the network 105. For instance, the content publisher 115 can include a web page operator who provides primary content for display on the web page. The one or more information resources 144 can include content other than that provided by the content providers 120A-N, and the web page can include content slots configured for the display of content items from the content providers 120A-N. For instance, the content publisher 115 can operate the website of a company and can provide content about that company for display on web pages of the website. The web pages can include content slots configured for the display of third party content items of the content providers 120A-N. In some implementations, the content publisher 115 includes a search engine computing device (e.g. server) of a search engine operator that operates a search engine website. The primary content of search engine web pages (e.g., a results or landing web page) can include results of a search as well as third party content items displayed in content slots such as content items from the content providers 120. The functionality of the content publisher 115 in the context of environment 100 will be explained below.

Each content provider 120A-N can include servers or other computing devices operated by a content provider entity to provide content items 146A-N (generally referred to as content item 146) for display on information resources 144 at the client device 125. The content provided by the content provider 120A-N can include third party content items 146 for display on information resources, such as an information resource 144 that includes primary content, e.g. content provided by the content provider 120A-N. The content items 146 can also be displayed on a search results web page. For instance, the content provider 120A-N can provide or be the source of ads or other content items 146 for display in content slots of information resources 144, such as a web page of a company where the primary content of the web page is provided by the company, or for display on a search results landing page provided by a search engine. The content items 146 associated with the content provider 120A-N can be displayed on information resources 144 other than web pages, such as content displayed as part of the execution of an application on a smartphone or other client device 125. The functionality of the content provider 120A-N in the context of environment 100 will be explained below.

The client device 125 can include computing devices configured to communicate via the network 105 to display data such as the content provided by a content publisher device (e.g., primary webpage content or other information resources) and the content provided by a content provider device (e.g., content items configured for display in an information resource). The client device 125 can include desktop computers, laptop computers, tablet computers, smartphones, personal digital assistants, mobile devices, consumer computing devices, servers, clients, digital video recorders, a set-top box for a television, a video game console, or any other computing device configured to communicate via the network 105. The client device 125 can be a communication device through which an end user can submit requests to receive content. The requests can be requests to a search engine, and the requests can include search queries. In some implementations, the requests can include a request to access a webpage.

The client device 125 can include a processor and a memory, i.e., a processing circuit. The memory stores machine instructions that, when executed by processor, cause processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language.

The client device 125 may also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of the client device 125 (e.g., a built-in display, microphone, etc.) or external to the housing of the client device 125 (e.g., a monitor connected to the client device 125, a speaker connected to the client device 125, etc.). In some implementations, the client device 125 may include an electronic display, which visually displays webpages using webpage data received from one or more content sources and/or from the content publisher 115 or the content provider 120A-N via the network 105.

The client device 125 can execute an application 160. The application 160 can include, for example, an Internet browser, a mobile application, or any other computer program capable of executing or otherwise invoking computer-executable instructions processed by the client device 125, such as the computer-executable instructions included in the information resource 144. The information resource 144 included therein can correspond to a script, logic, markup, or instructions (e.g., HyperText Markup Language (HTML), Extensible HyperText Markup Language (XHTML), Extensible Markup Language (XML), Cascading Style Sheets (CSS), and JavaScript, or any combination thereof). The information resource 144 may include a header 162 and a body 164. The content item 146 may be inserted into the information resource 144. In some implementations, the information resource 144 may be part of a mobile application. In such implementations, the header 162 may correspond to a preliminary portion of a loading sequence for the mobile application and the body 164 may correspond to a subsequent runtime portion for the mobile application.

To fetch one of the information resources 144, the application 160 of the client device 125 can send a request for a resource to the content publisher 115. The request can include a device address, a device identifier, a device type, and an application profile, among other data. The address may be a Universal Resource Locator (URL), and can include a protocol, a hostname, and a file pathname, among other parameters. The hostname may correspond to the content publisher 115. The file pathname may correspond to one of the information resources 144 hosted by the content publisher 115. The device identifier may correspond to the client device 125. The device type may correspond to system configurations of the client device 125. The application profile may indicate which application (e.g., web browser type and version, etc.) is running on the client device 125 to execute and run the information resource 144. Once the request is sent, the network 105 may forward the request to the content publisher 115 as identified in the hostname.

Subsequently, the content publisher 115 can receive the request from the application 160. In turn, the content publisher 115 can parse the request to identify the information resource 144 to provide to the client device 125. In some implementations, the content publisher 115 can access a database to retrieve the information resource 144. The database may be a part of the content publisher 115, in communication with the content publisher 115, or otherwise accessible by the content publisher 115. The content publisher 115 can identify the information resource 144 to provide based on the hostname and the file pathname included in the request. In some implementations, the content publisher 115 can insert a script (e.g., a script requestor 166) into the header 162 of the information resource 144. The script may be provided by the data processing system 110, upon transmitting a request to the data processing system 110 for the script. Details of the scripts to be inserted into the header 162 for processing by the application 160 are discussed below. In some implementations, the content publisher 115 can maintain a list of device identifiers corresponding to client devices 125 that have accessed the information resources 144. In some implementations, in response to receiving the request from the application 160, the content publisher 115 can update the list of device identifiers with the device identifier included in the request. Upon identifying the information resource 144, the content publisher 115 can transmit or send the information resource 144 to the client device 125.

For processing the information resource 144, the application 160 can include any number of components, such as a document tree generator, rendering tree generator, and a display module. In reading the information resource 144, the application 160 can first process the header 162A-N (generally referred to as header 162) prior to processing the body 164A-N (generally referred to as body 164) and any other code included in the information resource 144. The document tree generator can parse the information resource to generate a Document Object Model (DOM) tree including the header 162 and the body 164 of the information resource 144 arranged in a hierarchical manner. Using the DOM tree, the rendering tree generator can generate a rendering tree specifying the visual properties or attributes of the content items of the information resource. The display module can render and display the information resource onto a display of the client device 125 based on the rendering tree.

The first script included in the header 162 of the information resource 144 may be the script requestor 166. As the script is included in the header 162, the application 160 may execute the script requestor 166 prior to the remainder of the information resource 144 (e.g., the body 164). In some implementations, the application 160 may execute the script requestor 166 and the header 162 prior to other DOM objects. Upon execution, the script requestor 166 can transmit or send a request for instructions to insert into the header 162 of the information resource. The instructions may be for selecting one of the content providers 120A-N for inserting a corresponding content item 146 into the information resource 144. The request for instructions may include an address, the device identifier, the device type, and the application profile, among other data. The address may be a Universal Resource Locator (URL), and can include a protocol, a hostname, and a file pathname, among other parameters. The hostname may correspond to the data processing system 110. In some implementations, the request for instructions may include one or more content provider identifiers. Each content provider identifier may correspond to one of the content providers 120A-N. The content provider identifiers may reference or indicate which content providers 120A-N are permitted to insert content items 164 into the information resource 144. Once the request is sent, the network 105 may forward the request to the data processing system 110 as identified in the hostname of the request for instructions.

The data processing system 110 can include at least one server for executing various functionalities to process the request from the script requestor 166. In some implementations, the data processing system 110 can include a plurality of servers located in at least one data center or server farm. In some implementations, the data processing system 110 includes a content placement system. In some implementations, the content placement system may include a third-party content selection server. The data processing system 110 can include at least one script provider 130, at least one identifier generator 132, at least one parameter aggregator 134, and at least one provider selector 136. Each of the at least one script provider 130, at least one identifier generator 132, at least one parameter aggregator 134, and at least one provider selector 136 can include at least one processing unit, server, virtual server, circuit, engine, agent, appliance, or other logic device such as programmable logic arrays configured to communicate with the database 138 and with other computing devices (e.g., the content provider 115, the content publisher 120A-N, or the client device 125,) via the network 105. The data processing system 110 can also include one or more content repositories or databases 138. The databases 138 can be local to the data processing system 110. In some implementations, the databases 138 can be remote to the data processing system 110 but can communicate with the data processing system 110 via the network 105.

In response to the request from the script requestor 166, the script provider 130 can provide instructions to the client device 125 to insert into the header 162 of the information resource 144 for selection one of the content providers 120A-N. The instructions may be for selecting one of the content providers 120A-N for inserting a corresponding content item 146 into the information resource 144. The script provider 130 can select one of multiple scripts to provide to the application 160 for insertion into the header 162 of the information resource 144 based on the request received from the script provider 166. The functionalities of the scripts to be inserted into the header 162 are detailed below in conjunction with FIGS. 2A and 2B.

To determine which script to insert, the script provider 130 can determine whether the application 160 of the client device 125 has not previously accessed at least one information resource 144 of the content publisher 115. In some implementations, the script provider 130 can determine whether the client device 125 has previously accessed at least one information resource 144 of the content publisher 115 within a predetermined time window (e.g., 6 hours to 1 month). The predetermined time window may correspond to a single session of the content device 125 accessing content via the network 105, and may be calculated from a current time. The script provider 130 can identify a previous visit time that the client device 125 accessed one of the information resources 144 of the content publisher 115. In some implementations, the script provider 130 can send a request for the previous visit time to the content publisher 115. The content publisher 115 can access a database logging client devices 125 visiting the information resources 144 to identify the previous visit time of the client device 125. The script provider 130 can subsequently receive the previous visit time that the client device 125 from the content publisher 115. In some implementations, the script provider 130 can receive a null response from the content publisher 115 indicating that the client device 125 has never accessed any of the information resources 144. The script provider 130 can compare the previous visit time to the time window. If the previous visit time is greater than the time window or if the null response is received, the script provider 130 can determine that the client device 125 has not previously accessed at least one information resource 144 within the predetermined time window. On the other hand, if the previous time is less than or equal to the time window, the script provider 130 can determine that the client device 125 has previously accessed at least one information resource 144 of the content publisher 115.

In some implementations, the script provider 130 can determine whether a session identifier 140 has been generated for the client device 125 to determine whether the client device 125 has previously accessed at least one information resource 144 of the content publisher 115. To determine whether the session identifier 140 has been generated, the script provider 130 can access the database 138 using the request. The database 138 can store and maintain session identifiers 140 generated for client devices 125. The session identifiers 140 maintained at the database 138 may be indexed by the request for instructions (e.g., by device identifiers or address). If the session identifier 140 has been previously generated for the client device 125, the script provider 130 can determine that the application 160 of the client device 125 has previously accessed at least one information resource 144 of the content publisher 115. If the session identifier 140 has not been previously generated for the client device 125, the script provider 130 can determine that the application 160 of the client device 125 has not previously accessed at least one information resource 144 of the content publisher 115. Details regarding the generation of the session identifier 140 are discussed below.

In some implementations, the script provider 130 can send a request to the content publisher 115 to determine whether the client device 125 has accessed the information resources 144 of the content publisher 115. Subsequently, the script provider 130 can receive a response from the content publisher 115. The response can include an indicator identifying whether the client devices 125 has accessed the information resources 144 of the content publisher 115. In some implementations, on the database 138, the script provider 130 can maintain a list of device identifiers corresponding to client devices 125 that have transmitted a request for instructions to the data processing system 110. The script provider 130 can compare the device identifier of the request for instructions received from the script requestor 166 with the list of device identifiers stored on the database 138. If the device identifier does not match any of those in the list, the script provider 130 can determine that the client device 125 has not previously accessed any of the information resources 144 of the content publisher 115. On the other hand, if the device identifier matches any of those in the list, the script provider 130 can determine that the application 160 of the client device 125 has previously accessed at least one information resource 144 of the content publisher 115.

Figure 2A:
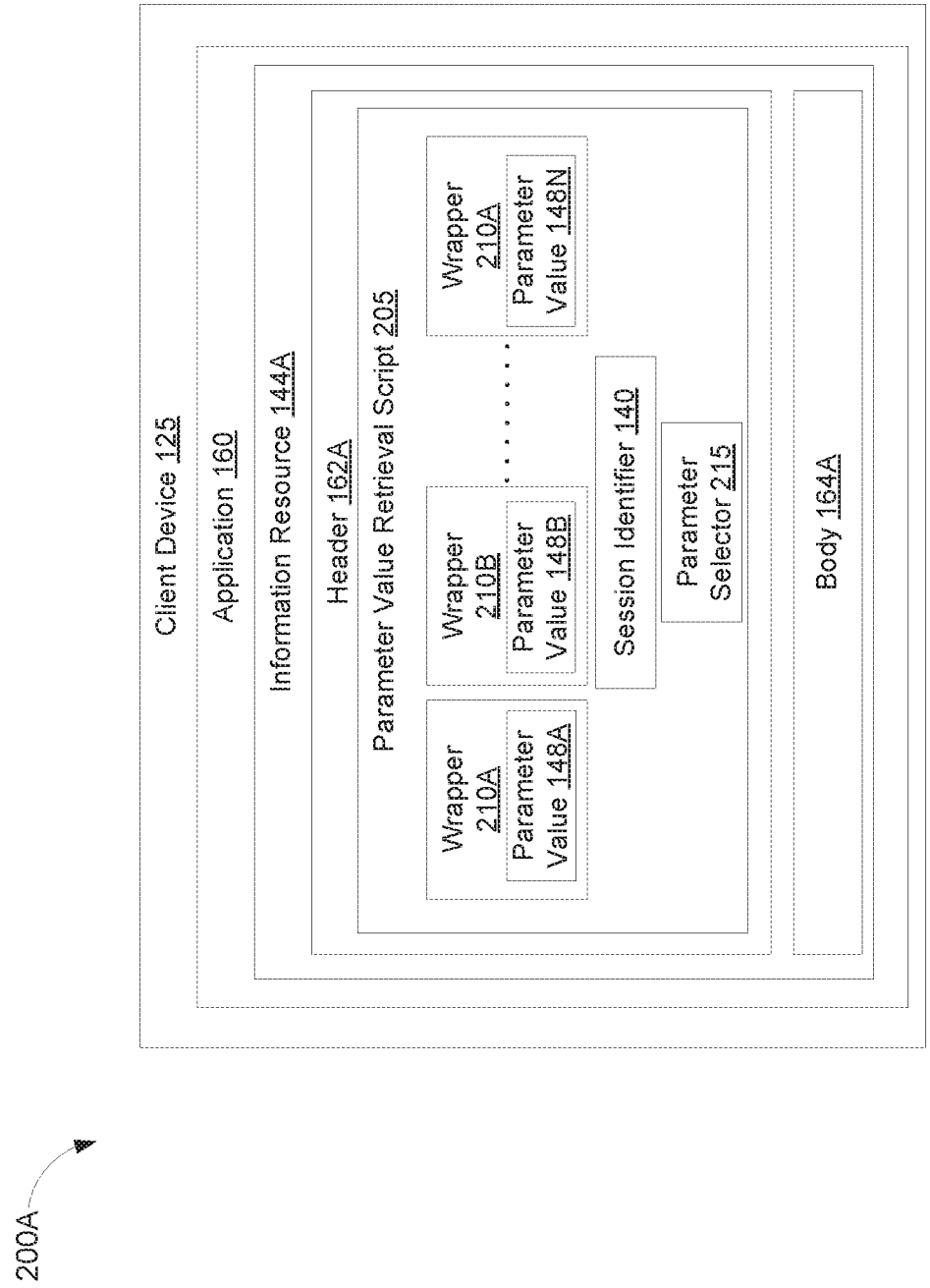
FIGS. 2A and 2B are block diagrams each depicting a system for maintaining session identifiers across multiple webpages for content selection, according to an illustrative implementation.

If the client device 125 has not previously accessed any of the information resources 144 of the content publisher 115, the script provider 130 can generate and provide a parameter value retrieval script 205 for insertion into the header 162. Referring now to FIG. 2A, depicted is a block diagram of one implementation of a system 200A for maintaining session identifiers across multiple webpages for content selection. As the client device 125 has not previously accessed any of the information resources 144 of the content publisher, the information resource 144 on the client device 125 may correspond to or be referred to a first information resource 144A. The parameter value retrieval script 205 may include one or more wrappers 210A-N, a session identifier 140, and a parameter selector 215. Each wrapper 210A-N may correspond to one of the content providers 120A-N. Each wrapper 210A-N may include a parameter value 148A-N from the respective content provider 120A-N. The functionalities of the parameter value retrieval script 205 and its components are detailed below.

In the context of FIG. 1, the identifier generator 132 can generate the session identifier 140, responsive to determining that the client device 125 has not previously accessed any of the information resources 144 of the content publisher 115. The session identifier 140 may correspond to the client device 125, and may be for use in selecting content to be served across the information resources 144A-144N of the content publisher 115. In some implementations, the session identifier 140 may be an alphanumeric string, a numeric value (e.g., integer), or any other value used to uniquely identify the client device 125. The identifier generator 132 can generate the session identifier 140 based on the request for instructions received from the client device 125. In some implementations, the identifier generator 132 can determine the session identifier 140 using the device identifier, the device type, and the application profile, among other data, included in the request. In some implementations, the identifier generator 132 can generate a hash value for the session identifier 140 by applying a hashing function to a device address corresponding to the client device 125 (e.g., Internet Protocol (IP) address or Media Access Control (MAC) address, etc.). In some implementations, the identifier generator 132 can insert the session identifier 140 into the parameter value retrieval script 205. The identifier generator 132 can also store the generated session identifier 140 on the database 138.

With the session identifier 140 generated, the identifier generator 132 can provide the session identifier 140 to the content providers 120A-N. The identifier generator 132 can identify which content providers 120A-N to provide the session identifier 140. In some implementations, the content providers 120A-N to which to provide the session identifier 140 may be identified based on the content provider identifiers included in the request for instructions from the client device 125. In some implementations, the content providers 120A-N to which to provide the session identifier 140 may be identified based on the content publisher 115. The identifier generator 132 can access the database 138 to identify which content providers 120A-N the content publisher 115 has permitted to insert content items 146 into the information resources 144 of the content publisher 115. The identifier generator 132 can also send a request to the content publisher 115 to identify the content providers 120A-N that the content publisher 115 has permitted to insert the content items 146 into the information resources 144. Once the content providers 120A-N are identified, the identifier generator 132 can transmit or send the session identifier 140 to the one or more content providers 120A-N. In some implementations, the session identifier 140 may be sent by the parameter aggregator 134 to the content providers 120A-N as part of a request for content selection parameter values. The request for content selection parameter values may include the device type for the client device 125, the application profile corresponding to the application 160, system configurations of the client device 125 (e.g., display size, resolution, network bandwidth, etc.), and content slot size for the content item 146, among other data.

Upon receipt of the session identifier 140, each content provider 120A-N can store the session identifier 140 as corresponding to the client device 125. In some implementations, each content provider 120A-N can store the session identifier 140 on a database associated with the content provider 120A-N. In some implementations, the content provider 120A-N can also set the session identifier 140 as associated with the content publisher 115. The session identifier 140 may be used by the content provider 120A-N to access state data (e.g., cookies) from the client device 125. In this manner, the content provider 120A-N can identify the same client device 125 accessing one or more information resources 144 for insertion of the content items 146 onto the information resource 144 using the session identifier 140.

In some implementations, upon storage of the session identifier 140, the content provider 120A-N can also provide the corresponding parameter value 148A-N to the parameter aggregator 134. The parameter value 148A-N can include a numeric bid value (e.g., a double, integer, or floating datatype, etc.), an interaction rate (e.g., click through rate, impression rate, exposure time, etc.), a relevancy metric, one or more keywords (e.g., associated with the content provider 120A-N or the content item 146), or any other value used to select the content item 146 to be provided by the content provider 120A-N to insert onto the information resource 144. In some implementations, the content provider 120A-N may calculate the parameter value 148A-N based on the request from the identifier generator 132. In some implementations, the content provider 120A-N can parse the request to identify the device type for the client device 125, the application profile corresponding to the application 160, system configurations of the client device 125 (e.g., display size, resolution, network bandwidth, etc.), and content slot size for the content item 146, among other data. Based on the request, the content provider 120A-N can calculate the parameter values 148A-N to provide to the parameter aggregator 134 for the client device 125.

In some implementations, the content provider 120A-N can determine a conditional sequence of values as the parameter values 148A-N to provide to the parameter aggregator 134. The conditional sequence of values can specify the parameter value 148A-N to use for the first information resource 144A and then subsequent resources 144B-N accessed by the client device 125. In some implementations, the conditional sequence may specify one parameter value 148A-N for a second information resource 144B based on selection of the content provider 120A-N on a first information resource 144A and specify another parameter value 148A-N for the second information resource 144B based on non-selection of the content provider 120A-N on the first information resource 144A. The use of the parameter value 148A-N in selecting the content item 146 to insert onto the first information resource 144A is detailed below. Once the parameter values 148A-N are gathered from each of the content providers 120A-N, the parameter aggregator 134 can insert the received parameter values 148A-N into the parameter value retrieval script 205.

Within the parameter value retrieval script 205, the script provider 130 can generate the wrapper 210A-N. Each generated wrapper 210A-N may correspond to one of the content providers 120A-N. Each wrapper 210A-N may correspond to a subroutine or a sub-function (e.g., in the form of JAVASCRIPT) of the parameter value script 205 for retrieving or providing the parameter value 148A-N to the parameter selector 215. In some implementations, each wrapper 210A-N may include an address for retrieving the parameter value 148A-N. The address may include a hostname corresponding to the content provider 120A-N and a file pathname corresponding to the specific parameter value 148A-N of the content provider 120A-N for the client device 125. In some implementations, the wrappers 210A-N of the parameter value retrieval script 205 may be pre-loaded with the parameter values 148A-N. In some implementations, the wrappers 210A-N may include an address of the respective content providers 120A-N for retrieving the parameter values 148A-N.

Having generated the parameter value retrieval script 205, the script provider 130 can transmit the parameter value retrieval script 205 to the client device 125. Once received by the application 160 of the client 125, the application 160 can insert the parameter value retrieval script 205 into the header 162A and can execute the parameter value retrieval script 205. The execution of the parameter value retrieval script 205 may be prior to the remainder of the information resource 144A, such as the body 164A and other content objects of the information resource 144A. In some implementations, the wrappers 210A-N may be invoked prior to the parameter selector 215, or vice-versa.

The parameter selector 215 can use the one or more parameter values 148A-N to select one of the content providers 120A-N for insertion of content item 146 into the body 164A of the information resource 144A. The parameter selector 215 can invoke each of the wrappers 210A-N to retrieve or obtain the parameter values 148A-N for selection of the content provider 120A-N. In some implementations, upon invocation, each wrapper 210A-N can send a request for content selection parameter value to the corresponding content provider 120A-N. The request for the selection parameter value can include the session identifier 140. Using the session identifier 140, each content provider 120A-N can provide the parameter value 148A-N. Subsequently, each wrapper 210A-N can receive the parameter value 148A-N from the respective content provider 120A-N. In some implementations, each wrapper 210A-N may be pre-loaded with the parameter value 148A-N and may provide the parameter value 148A-N upon invocation by the parameter selector 215. In some implementations, a subset of the wrappers 210A-N may be pre-loaded with the parameter values 148A-N, whereas another subset of wrappers 210A-N may request the parameter values 148A-N from the respective content providers 120A-N using the session identifier 140 upon execution on the application 160.

With the parameter values 148A-N obtained from the one or more wrappers 210A-N, the parameter selector 215 can execute a content selection process to identify which content provider 120A-N to select. In some implementations, the content selection process can include a header bidding technique. In some implementations, in running the content selection process, the parameter selector 215 can identify the highest parameter value 148A-N out of the parameter values 148A-N received from the content providers 120A-N. The parameter selector 215 can then select the content provider 120A-N corresponding to the highest parameter value 148A-N. In some implementations, in running the content selection process, the parameter selector 215 can calculate a combined selection value for each content provider 120A-N using the respective parameter values 148A-N. The combined selection value may correspond to one of the content providers 120A-N, and may be a function of the numeric bid value, the interaction rate, the relevancy metric, and the one or more keywords of the corresponding parameter value 148A-N. The parameter selector 215 can then identify the greatest combined selection value. The parameter selector 215 can then select the content provider 120A-N corresponding to the greatest combined selection value for identifying which content provider 120A-N to request the content item 146 from to insert into the information resource 144A.

Upon selecting one of the content providers 120A-N, the parameter selector 215 can transmit a request for content to the content provider 120A-N to insert a content item 146 onto the first information resource 144A. The request for content may include the application profile corresponding to the application 160, system configurations of the client device 125 (e.g., display size, resolution, network bandwidth, etc.), and content slot size, among others. Based on the request for content, the content provider 120A-N can identify the content item 146 to provide to the application 160 of the client 125. Each content provider 120A-N may have multiple content items 164 to select one content item 146. Once selected, the content provider 120A-N can transmit the content item 146 to the client device 125. The application 160 of the client device 125 can in turn receive the content item 146, and can insert the content item 146 into the body 164A of the information resource 144A or some other location in the remainder of the information resource 144A subsequent to the header 162A.

Figure 2B:
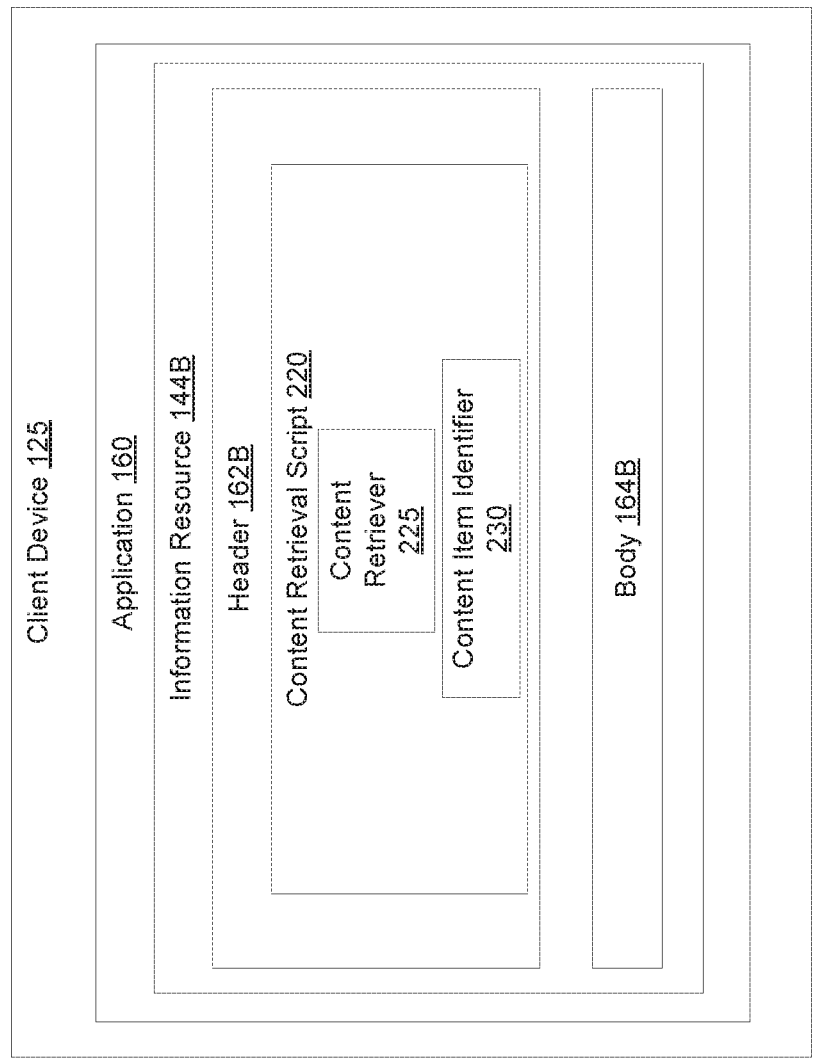

On the other hand, if the client device 125 has previously accessed any of the information resources 144 of the content publisher 115, the script provider 130 can generate and provide a content retrieval script 220. In some implementations, the script provider 130 can receive the request for instructions from the client device 125, subsequent to providing the parameter value retrieval script 205 to the client device 125. In some implementations, the subsequent request for instructions can include the session identifier 140 previously generated for the client device 125. As the client device 125 had previously accessed any of the information resources 144 of the content publisher, the information resource 144 on the client device 125 may correspond to or be referred to a second information resource 144B or a subsequent information resource 144B-N. For the subsequent request, the data processing system 110 may run the content selection process for the second information resource 144B, instead of the client device 125 as was for the first information resource 144A. Referring now to FIG. 2B, depicted is a block diagram of one implementation of a system 200B for maintaining session identifiers across multiple webpages for content selection. The content retrieval script 220 can include a content retriever 225 and a content item identifier 230. The functionality of the content retrieval script 220 is detailed below.

To generate the content retrieval script 220, referring back to FIG. 1, the script provider 130 can parse the subsequent request from the client device 125 to identify the session identifier 140. The subsequent request for instructions may or may not include the session identifier 140. In some implementations, the subsequent request for instructions may include the address, the device identifier, the device type, and the application profile, among other data. Based on the subsequent request for instructions, the script provider 130 can identify session identifier 140 for the client device 125. In some implementations, using the address, the device identifier, the device type, and the application profile included in the request, the script provider 130 can access the database 138 to identify the session identifier 104. As discussed above, the session identifier 140 may be stored and maintained on the database 138, and may be indexed by the data from the previous request. In some implementations, the script provider 130 can parse the subsequent request to determine a presence of the session identifier 140 to determine whether the session identifier 140 is included in the request.

Once the session identifier 140 is identified from the request, the parameter aggregator 134 can obtain the parameter values 148A-N for each of the content providers 120A-N. In some implementations, the parameter values 148A-N may have been previously obtained in response to the previous request for instructions. In some implementations, the parameter values 148A-N may differ from the previous parameter values 148A-N obtained for the parameter value retrieval script 205. In some implementations, the parameter aggregator 134 can transmit a request for content selection parameter values to the content providers 120A-N. The parameter aggregator 134 can identify which content providers 120A-N to provide the session identifier 140. In some implementations, the content providers 120A-N to which to provide the session identifier 140 may be identified based on the content provider identifiers included in the request for instructions from the client device 125. In some implementations, the content providers 120A-N to which to provide the session identifier 140 may be identified based on the content publisher 115. The parameter aggregator 134 can access the database 138 to identify which content providers 120A-N the content publisher 115 has permitted to insert content items 146 into the information resources 144 of the content publisher 115. The parameter aggregator 134 can also send a request to the content publisher 115 to identify the content providers 120A-N that the content publisher 115 has permitted to insert the content items 146 into the information resources 144. Once the content providers 120A-N are identified, the parameter aggregator 134 can transmit or send the session identifier 140 to the one or more content providers 120A-N.

Upon receipt of the session identifier 140, each content provider 120A-N can identify the parameter value 148A-N to provide to the parameter aggregator 134. The content provider 120A-N can identify the parameter value 148A-N based on the session identifier 140. In some implementations, the content provider 120A-N can access a database to find the parameter value 148A-N associated with the session identifier 140 and/or the content provider 115. In some implementations, the parameter value 148A-N may differ among the information resources 144 of the content publisher 115. Having identifier the parameter value 148A-N using the session identifier 140, the content provider 120A-N can return and send the parameter value 148A-N to the parameter aggregator 134. In this manner, the client device 125 may no longer have to send separate requests to each of the content providers 120A-N for parameter values 148A-N, thereby reducing latency in the network 105 and consumption of computing resources at the client device 125.

With the parameter values 148A-N obtained for the content providers 120A-N, the provider selector 136 can execute a content selection process to identify which content provider 120A-N to select. In some implementations, in running the content selection process, the provider selector 136 can identify the highest parameter value 148A-N out of the parameter values 148A-N received from the content providers 120A-N. The provider selector 136 can then identify and select the content provider 120A-N corresponding to the highest parameter value 148A-N. In some implementations, in running the content selection process, the provider selector 136 can calculate a combined selection value for each content provider 120A-N using the respective parameter values 148A-N. The combined selection value may correspond to one of the content providers 120A-N, and may be a function of the numeric bid value, the interaction rate, the relevancy metric, and the one or more keywords of the corresponding parameter value 148A-N. The provider selector 136 can then identify the greatest combined selection value. The provider selector 136 can then select the content provider 120A-N corresponding to the greatest combined selection value for identifying which content provider 120A-N to request the content item 146 from to insert into the information resource 144B. In this manner, the client device 125 may no longer have to run the content selection process using parameter values 148A-N of the content providers 120A-N, thereby lowering consumption of computing resources at the client device 125.

In some implementations, the provider selector 136 can use the conditional sequence of values to run the content selection process. As discussed above, the conditional sequence may specify a first parameter value 148A-N for a second information resource 144B based on selection of the content provider 120A-N on a first information resource 144A and may specify a second parameter value 148A-N for the second information resource 144B based on non-selection of the content provider 120A-N on the first information resource 144A. The provider selector 136 can identify which content provider 120A-N was selected for the first information resource 144A. Based on which content provider 120A-N was selected, the provider selector 136 can select the parameter value 148A-N to use in the content selection process as specified in the conditional sequence. If the content provider 120A-N was not selected in the first information resource 144A, the provider selector 136 can identify the second parameter value 148A-N for use in the content selection process for the content provider 120A-N. If the content provider 120A-N was selected in the first information resource 144A, the provider selector 136 can identify the first parameter value 148A-N for use in the content selection process for the content provider 120A-N. The content selection process used in conjunction with the conditional sequence may be the same as described above.

In some implementations, the provider selector 136 can use parameter values 146 directly provided by the content providers 115A-N, as opposed to the conditional sequence retrieved previously. The parameter values 146 may be dynamic, and may have changed since the information resource 144 was accessed by the client device 125. The provider selector 136 can generate a random value using a pseudo-number generator. Based on the random value, the provider selector 136 can use the parameter value 146 from the content provider 120A-N, instead of the conditional sequence. In some implementations, the provider selector 136 can compare the random value to a first range for using the parameter value 146 to a second range for using the conditional sequence. If the random value is within the first range, the provider selector 136 can send a request to each content provider 120A-N for a new parameter value 146. If the random value is within the second range, the provider selector 136 can proceed to use the conditional sequence previously received from each of the content providers 120A-N. In this manner, the content provider 115 can compare interaction statistics with the content items 146 inserted onto the information resources 144 when new parameter values 146 are used versus when the conditional sequence is used in the content selection process.

Upon selecting one of the content providers 120A-N, the provider selector 136 can transmit a request for content to the content provider 120A-N for inserting a content item 146 onto the information resource 144B. The request for content may include the application profile corresponding to the application 160, system configurations of the client device 125 (e.g., display size, resolution, network bandwidth, etc.), and content slot size, among others. Based on the request for content, the content provider 120A-N can identify the content item 146 to provide to the application 160 of the client 125. Each content provider 120A-N may have multiple content items 164 to select one content item 146. Once selected, the content provider 120A-N can transmit a content item identifier 230 corresponding to the content item 146 to the provider selector 136. The content item identifier 230 may be a Universal Resource Locator (URL), and may include a protocol, a hostname corresponding to the selected content provider 120A-N, and a file pathname corresponding to the specific content item 146 to be inserted into the information resource 144B, among other parameters. The provider selector 136 can insert the content item identifier 230 into the content retrieval script 220. The script provider 130 can in turn transmit the content retrieval script 220 to the application 160 of the client device 125. In some implementations, the script provider 130 can return a null to the application 160 of the client device 125 and can maintain the content item identifier 230 on the data processing system 110. In such implementations, upon receipt of a request for content to insert into the information resource 144B, the script provider 136 can transmit the selected content item 146 to the client device 125 for insertion into the body 164B of the information resource 144B. The request for content may be generated using a script in the body 164B of the information resource 144B.

Once received by the application 160 of the client 125, the application 160 can insert the content retrieval script 220 into the header 162B and can execute the parameter content retrieval script 220. In some implementations, the application 160 can execute the content retriever 225. The execution of the content retrieval script 220 may be prior to the remainder of the information resource 144B, such as the body 164B and other content objects of the information resource 144B. The content retriever 225 can transmit a request for content to the content provider 120A-N specified in the content item identifier 230. The request for content can include the content item identifier 230. Upon receipt of the request for content from the content retriever 225, the recipient content provider 120A-N can identify the content item 146 to be provided to the client device 125. Once identifier, the content provider 120A-N can transmit the content item 146 to the client device 125. The application 160 of the client device 125 can receive the content item 146. The content retriever 225 can insert the content item 146 into the body 164B of the information resource 144B or some other location in the remainder of the information resource 144B subsequent to the header 162B.

In some implementations, the script provider 130 can provide the parameter value retrieval script 205 for subsequent information resources 144B-N after providing the content retrieval script 220, regardless of whether the client device 125 has previously accessed at least one information resource 144 of the content publisher 115. The script provider 130 can generate a random value using a pseudo-number generator. Based on the random value, the script provider 130 can provide the parameter value retrieval script 205, instead of the content retrieval script 220. In some implementations, the script provider 130 can compare the random value to a first range for providing the parameter value retrieval script 205 or to a second range for providing the content retrieval script 220. If the random value is within the first range, the script provider 130 can provide the application 160 of the client device 125 the parameter value retrieval script 205. If the random value is within the second range, the script provider 130 can provide the application 160 of the client device 125 the content retrieval script 220. In this manner, the content provider 115 can compare interaction statistics with the content items 146 inserted onto the information resources 144 with the parameter value retrieval script 205 and with the content retrieval script 220.

Figure 3B:
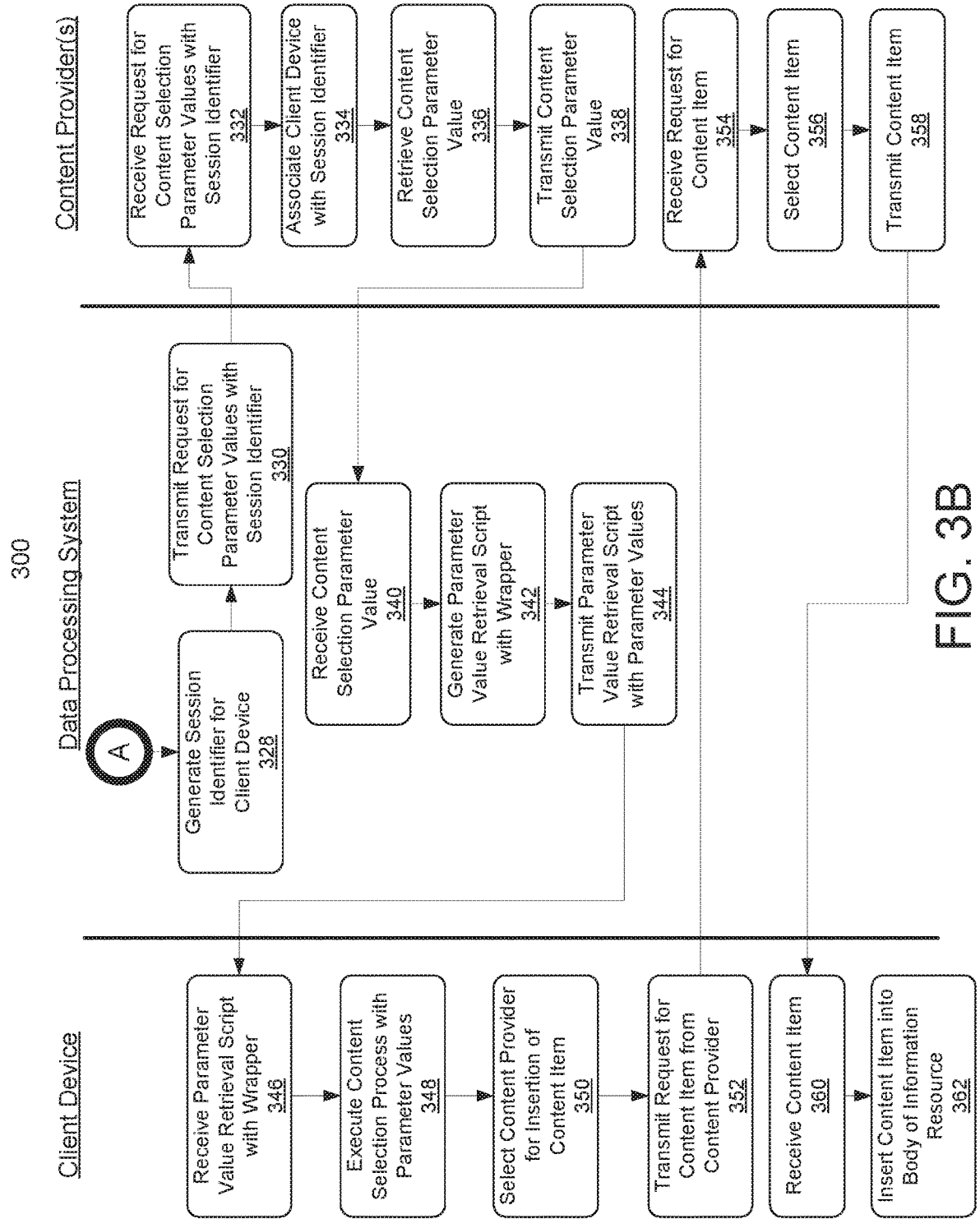
Figure 3C:
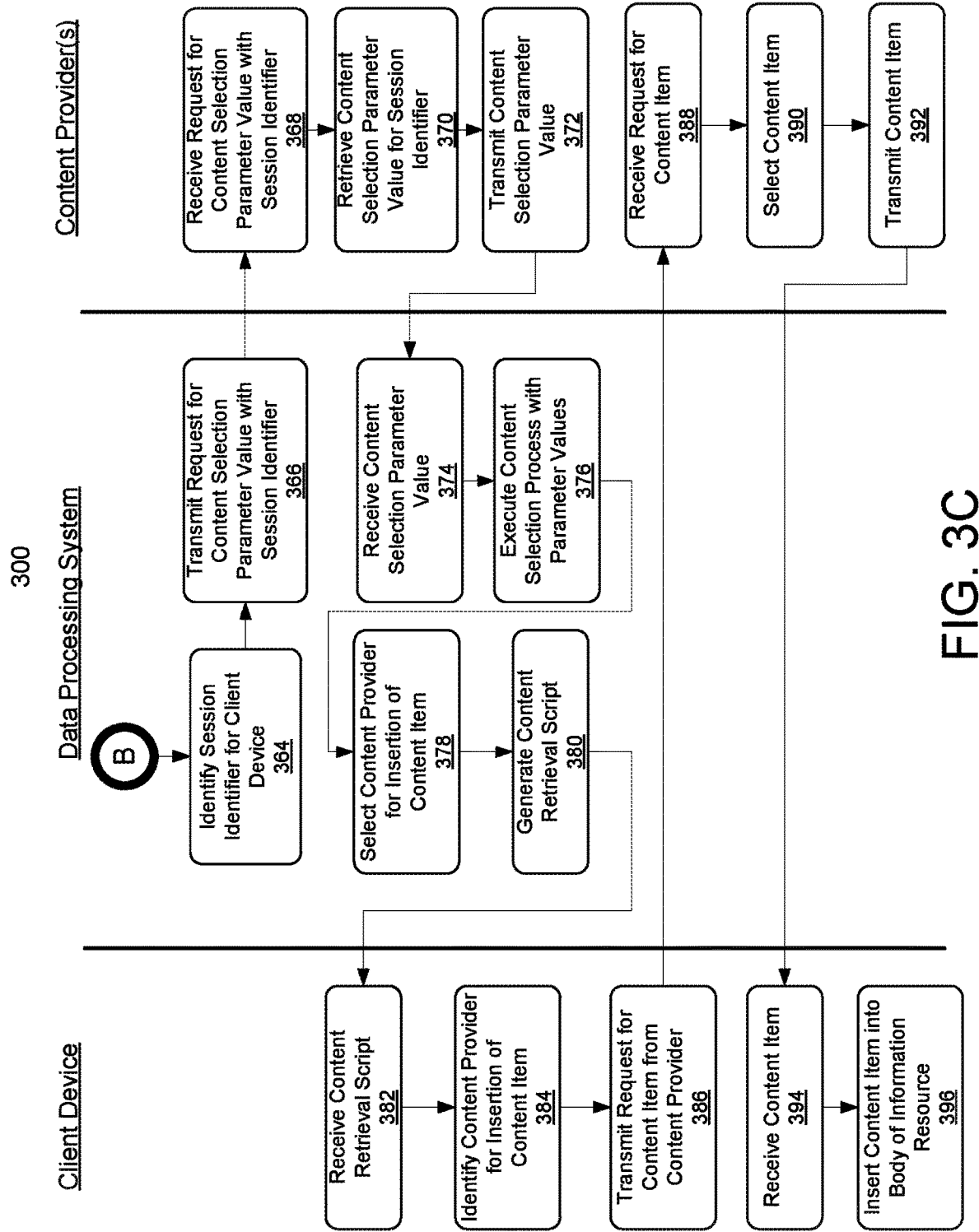
Figure 5:
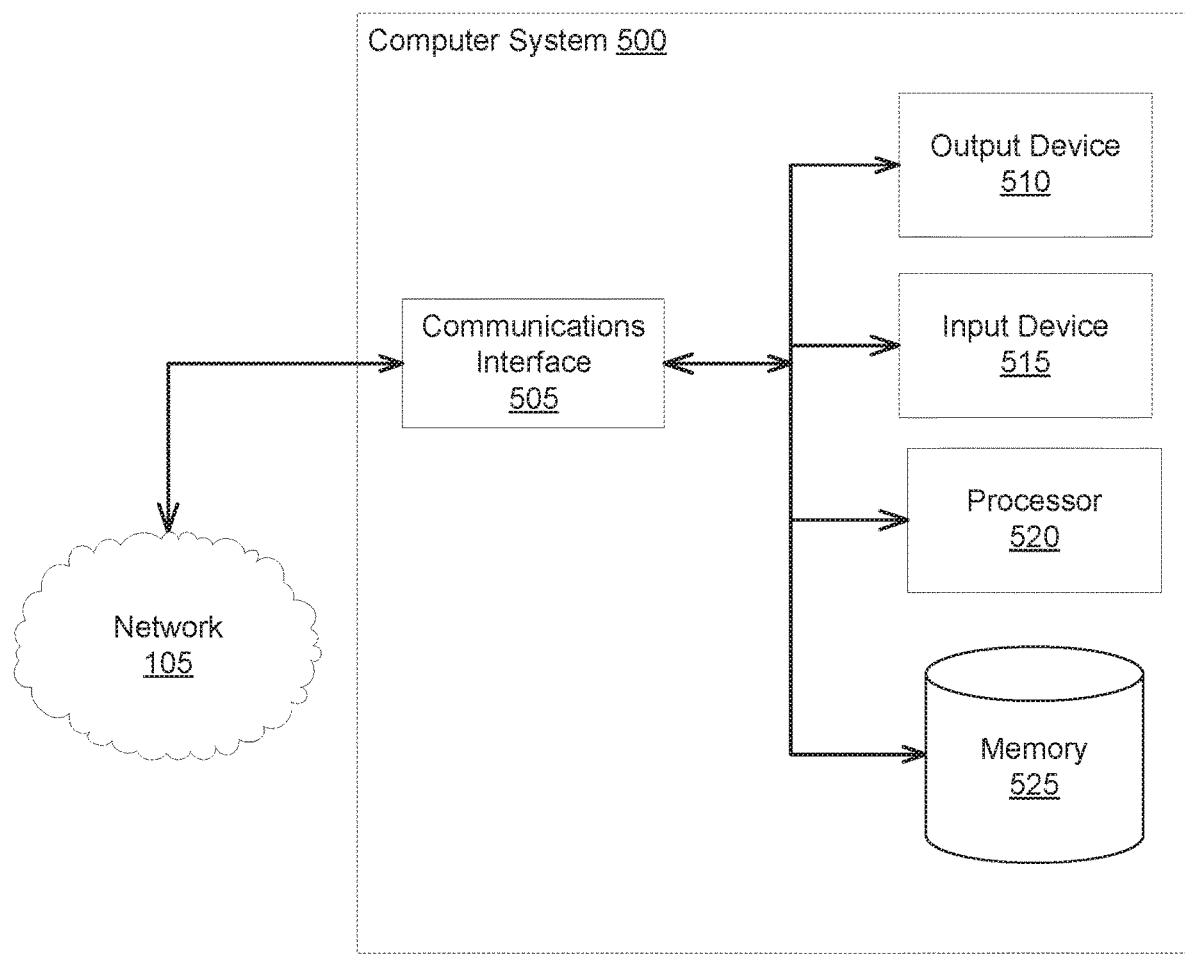
FIG. 5 is a block diagram illustrating a general architecture for a computer system that may be employed to implement elements of the systems and methods described and illustrated herein, according to an illustrative implementation.

Now referring to FIGS. 3A-3C, depicted is a flow diagram a method 300 of maintaining session identifiers across multiple webpages for content selection. The functionality described herein with respect to method 300 can be performed or otherwise executed by the system 100 as shown on FIG. 1, systems 200A and 200B as shown in FIGS. 2A and 2B, or a computing device as shown in FIG. 5 or any combination thereof. In some implementations, the functionalities of method 300 may be split between the client device 125, the data processing system 110, the content publisher 115, and the content providers 120A-120N.

Starting from FIG. 3A, at step 302, a content publisher can transmit a request to insert a header script. At step 304, a data processing system can in turn receive the request to insert the header script. At step 306, the data processing system can generate and transmit a header request script. At step 308, the content publisher in turn can receive the header request script. At step 310, the content publisher can insert the header request script into each information resource. Sometime subsequently, at step 312, a client device can transmit a request for an information resource. At step 314, the content publisher in turn can receive the request for the information resource. At step 316, the content publisher can identify and transmit the information resource with the request script included in the header of the information resource. At step 318, the client device can receive the information resource with the request script. At step 320, the client device can execute the request script include in the header. With the execution of the request script, at step 322, the client device can transmit a request to insert a script into the header. At step 324, the data processing system can receive the request to insert the script into the header. At step 326, the data processing system can determine whether the request is first for an information resource of content publisher from the client device.

Moving onto FIG. 3B, if the request is the first for an information resource of the content publisher from the client device, at step 328, the data processing system can generate a session identifier for the client device. At step 330, the data processing system can transmit a request for content selection parameter values with the session identifier to a content provider. In turn, at step 332, the content provider can receive the request for content selection parameter values with the session identifier. At step 334, the content provider can associate the client device with the session identifier. At step 336, the content provider can retrieve the content selection parameter value for the client device. At step 338, the content provider can transmit the content selection parameter value to the data processing system. At step 340, the data processing system in turn can receive the content selection parameter value from the content provider. At step 342, the data processing system can generate a parameter value retrieval script with a wrapper corresponding to the content provider. At step 344, the data processing system can transmit the parameter value retrieval script with parameter values.

At step 346, the client device can receive the parameter value retrieval script with the wrapper. At step 348, the client device can execute a content selection process with the parameter values. At step 350, the client device can select the content provider for insertion of the content item. At step 352, the client device can transmit a request for content from the selected content provider. At step 354, the content provider in turn can receive the request for the content. At step 356, the content provider can select a content item. At step 358, the content provider can transmit the content item to the client device. At step 360, the client device can in turn receive the content item from the content provider. At step 362, the client device can insert the content item into the body of the information resource.

On the other hand, with reference to FIG. 3C, if the request is not the first for an information resource of the content publisher from the client device, at step 364, the data processing system can identify the session identifier for the client device included in the request. At step 366, the data processing system can transmit a request for content selection parameter values with the session identifier. At step 368, the content provider can receive the request for content selection parameter value with the session identifier. At step 370, the data content provider can retrieve the content selection parameter value using the session identifier. At step 372, the content provider can transmit the content selection parameter value to the data processing system. At step 374, the data processing system can receive the content selection parameter value. At step 376, the data processing system can execute the content selection process with the parameter values received from the content providers. At step 378, the data processing system can select one of the content providers for insertion of the content item. At step 380, the data processing system can generate and transmit a content retrieval script to the client device. At step 382, the client device can receive the content retrieval script from the data processing system. At step 384, the client device can identify the content provider for insertion of the content item. At step 386, the client device can transmit a request for content to the content provider. At step 388, the content provider in turn can receive the request for content. At step 390, the content provider can select a content item identified in the request. At step 392, the content provider can transmit the content item to the client device. At step 394, the client device can receive the content item from the content provider. At step 396, the client device can insert the received content item into the body of the information resource.

Figure 4:
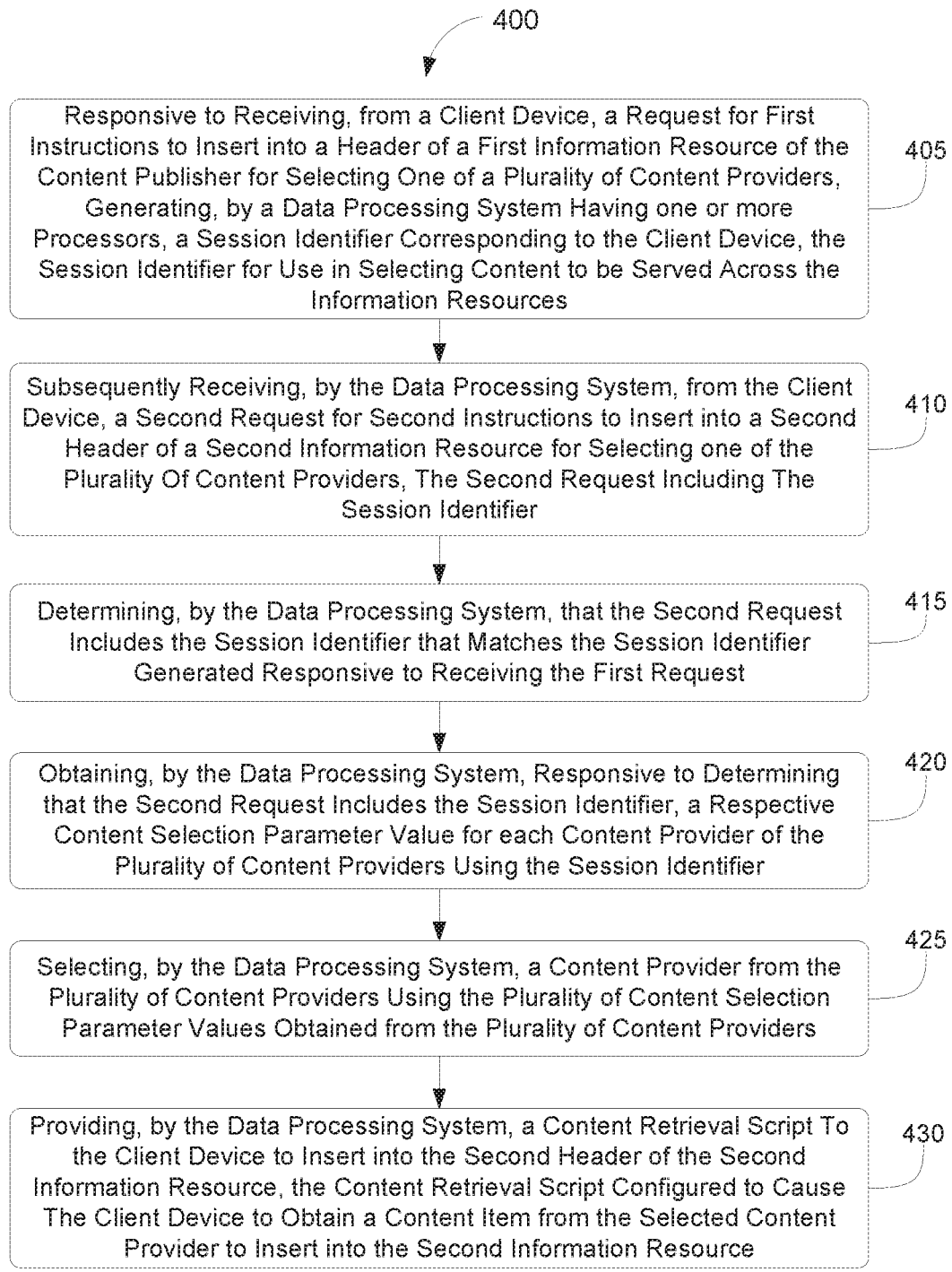
FIG. 4 is a flow diagram depicting a method of maintaining session identifiers across multiple webpages for content selection, according to an illustrative implementation

Now referring to FIG. 4, depicted is a flow diagram a method 400 of maintaining session identifiers across multiple webpages for content selection. The functionality described herein with respect to method 400 can be performed or otherwise executed by the system 100 as shown on FIG. 1, systems 200A and 200B as shown in FIGS. 2A and 2B, or a computing device as shown in FIG. 5 or any combination thereof. In some implementations, the functionalities of method 300 may be split between the client device 125, the data processing system 110, the content publisher 115, and the content providers 120A-120N.

In further detail, at step 405, a data processing system having one or more processors can generate, responsive to receiving from a client device a first request for first instructions to insert into a first header of a first information resource of a content publisher for selecting one of a plurality of content providers, a session identifier corresponding to the client device for use in selecting content to be served across a plurality of information resources of the content publisher. The session identifier may be provided to the plurality of content providers.

To fetch one of the information resources, the application of the client device can send a request for a resource to the content publisher. The request can include a device address, a device identifier, a device type, and an application profile, among other data. The address may be a Universal Resource Locator (URL), and can include a protocol, a hostname, and a file pathname, among other parameters. The hostname may correspond to the content publisher. The file pathname may correspond to one of the information resources hosted by the content publisher. The device identifier may correspond to the client device. The device type may correspond to system configurations of the client device. The application profile may indicate which application (e.g., web browser type and version, etc.) is running on the client device to execute and run the information resource. Once the request is sent, the network may forward the request to the content publisher as identified in the hostname.

Subsequently, the content publisher can receive the request from the application. In turn, the content publisher can parse the request to identify the information resource to provide to the client device. In some implementations, the content publisher can access a database to retrieve the information resource. The database may be a part of the content publisher, in communication with the content publisher, or otherwise accessible by the content publisher. The content publisher can identify the information resource to provide based on the hostname and the file pathname included in the request. In some implementations, the content publisher can insert a script (e.g., a script requestor) into the header of the information resource. The script may be provided by the data processing system, upon transmitting a request to the data processing system for the script. Details of the scripts to be inserted into the header for processing by the application are discussed below. In some implementations, the content publisher can maintain a list of device identifiers corresponding to client devices that have accessed the information resources. In some implementations, in response to receiving the request from the application, the content publisher can update the list of device identifiers with the device identifier included in the request. Upon identifying the information resource, the content publisher can transmit or send the information resource to the client device.

For processing the information resource, the application can include any number of components, such as a document tree generator, rendering tree generator, and a display module. In reading the information resource, the application can first process the header prior to processing the body and any other code included in the information resource. The document tree generator can parse the information resource to generate a Document Object Model (DOM) tree including the header and the body of the information resource arranged in a hierarchical manner. Using the DOM tree, the rendering tree generator can generate a rendering tree specifying the visual properties or attributes of the content items of the information resource. The display module can render and display the information resource onto a display of the client device based on the rendering tree.

The first script included in the header of the information resource may be the script requestor. As the script is included in the header, the application may execute the script requestor prior to the remainder of the information resource (e.g., the body). In some implementations, the application may execute the script requestor and the header prior to other DOM objects. Upon execution, the script requestor can transmit or send a request for instructions to insert into the header of the information resource. The instructions may be for selecting one of the content providers for inserting a corresponding content item into the information resource. The request for instructions may include an address, the device identifier, the device type, and the application profile, among other data. The address may be a Universal Resource Locator (URL), and can include a protocol, a hostname, and a file pathname, among other parameters. The hostname may correspond to the data processing system. In some implementations, the request for instructions may include one or more content provider identifiers. Each content provider identifier may correspond to one of the content providers. The content provider identifiers may reference or indicate which content providers are permitted to insert content items into the information resource. Once the request is sent, the network may forward the request to the data processing system as identified in the hostname of the request for instructions.

In response to the request from the script requestor, the data processing system can provide instructions to the client device to insert into the header of the information resource for selection one of the content providers. The instructions may be for selecting one of the content providers for inserting a corresponding content item into the information resource. The data processing system can select one of multiple scripts to provide to the application for insertion into the header of the information resource based on the request received from the script provider.

To determine which script to insert, the data processing system can determine whether the application of the client device has not previously accessed at least one information resource of the content publisher. In some implementations, the data processing system can determine whether the client device has previously accessed at least one information resource of the content publisher within a predetermined time window (e.g., 6 hours to 1 month). The predetermined time window may correspond to a single session of the content device accessing content via the network, and may be calculated from a current time. The data processing system can identify a previous visit time that the client device accessed one of the information resources of the content publisher. In some implementations, the data processing system can send a request for the previous visit time to the content publisher. The content publisher can access a database logging client devices visiting the information resources to identify the previous visit time of the client device. The data processing system can subsequently receive the previous visit time that the client device from the content publisher. In some implementations, the data processing system can receive a null response from the content publisher indicating that the client device has never accessed any of the information resources. The data processing system can compare the previous visit time to the time window. If the previous visit time is greater than the time window or if the null response is received, the data processing system can determine that the client device has not previously accessed at least one information resource within the predetermined time window. On the other hand, if the previous time is less than or equal to the time window, the data processing system can determine that the client device has previously accessed at least one information resource of the content publisher.

In some implementations, the data processing system can determine whether a session identifier has been generated for the client device to determine whether the client device has previously accessed at least one information resource of the content publisher. To determine whether the session identifier has been generated, the data processing system can access the database using the request. The database can store and maintain session identifiers generated for client devices. The session identifiers maintained at the database may be indexed by the request for instructions (e.g., by device identifiers or address). If the session identifier has been previously generated for the client device, the data processing system can determine that the application of the client device has previously accessed at least one information resource of the content publisher. If the session identifier has not been previously generated for the client device, the data processing system can determine that the application of the client device has not previously accessed at least one information resource of the content publisher. Details regarding the generation of the session identifier are discussed below.

In some implementations, the data processing system can send a request to the content publisher to determine whether the client device has accessed the information resources of the content publisher. Subsequently, the data processing system can receive a response from the content publisher. The response can include an indicator identifying whether the client devices has accessed the information resources of the content publisher. In some implementations, on the database, the data processing system can maintain a list of device identifiers corresponding to client devices that have transmitted a request for instructions to the data processing system. The data processing system can compare the device identifier of the request for instructions received from the script requestor with the list of device identifiers stored on the database. If the device identifier does not match any of those in the list, the data processing system can determine that the client device has not previously accessed any of the information resources of the content publisher. On the other hand, if the device identifier matches any of those in the list, the data processing system can determine that the application of the client device has previously accessed at least one information resource of the content publisher.

If the client device has not previously accessed any of the information resources of the content publisher, the data processing system can generate and provide a parameter value retrieval script for insertion into the header. As the client device has not previously accessed any of the information resources of the content publisher, the information resource on the client device may correspond to or be referred to a first information resource. The parameter value retrieval script may include one or more wrappers, a session identifier, and a parameter value retrieval script. Each wrapper may correspond to one of the content providers. Each wrapper may include a parameter value from the respective content provider. The functionalities of the parameter value retrieval script and its components are detailed below.

The data processing system can generate the session identifier, responsive to determining that the client device has not previously accessed any of the information resources of the content publisher. The session identifier may correspond to the client device, and may be for use in selecting content to be served across the information resources of the content publisher. In some implementations, the session identifier may be an alphanumeric string, a numeric value (e.g., integer), or any other value used to uniquely identify the client device. The data processing system can generate the session identifier based on the request for instructions received from the client device. In some implementations, the data processing system can determine the session identifier using the device identifier, the device type, and the application profile, among other data, included in the request. In some implementations, the data processing system can generate a hash value for the session identifier by applying a hashing function to a device address corresponding to the client device (e.g., Internet Protocol (IP) address or Media Access Control (MAC) address, etc.). In some implementations, the data processing system can insert the session identifier into the parameter value retrieval script. The data processing system can also store the generated session identifier on the database.

With the session identifier generated, the data processing system can provide the session identifier to the content providers. The data processing system can identify which content providers to provide the session identifier. In some implementations, the content providers to which to provide the session identifier may be identified based on the content provider identifiers included in the request for instructions from the client device. In some implementations, the content providers to which to provide the session identifier may be identified based on the content publisher. The data processing system can access the database to identify which content providers the content publisher has permitted to insert content items into the information resources of the content publisher. The data processing system can also send a request to the content publisher to identify the content providers that the content publisher has permitted to insert the content items into the information resources. Once the content providers are identified, the data processing system can transmit or send the session identifier to the one or more content providers. In some implementations, the session identifier may be sent by the data processing system to the content providers as part of a request for content selection parameter values. The request for content selection parameter values may include the device type for the client device, the application profile corresponding to the application, system configurations of the client device (e.g., display size, resolution, network bandwidth, etc.), and content slot size for the content item, among other data.

Upon receipt of the session identifier, each content provider can store the session identifier as corresponding to the client device. In some implementations, each content provider can store the session identifier on a database associated with the content provider. In some implementations, the content provider can also set the session identifier as associated with the content publisher. The session identifier may be used by the content provider to access state data (e.g., cookies) from the client device. In this manner, the content provider can identify the same client device accessing one or more information resources for insertion of the content items onto the information resource using the session identifier.

In some implementations, upon storage of the session identifier, the content provider can also provide the corresponding parameter value to the data processing system. The parameter value can include a numeric bid value (e.g., a double, integer, or floating datatype, etc.), an interaction rate (e.g., click through rate, impression rate, exposure time, etc.), a relevancy metric, one or more keywords (e.g., associated with the content provider or the content item), or any other value used to select the content item to be provided by the content provider to insert onto the information resource. In some implementations, the content provider may calculate the parameter value based on the request from the data processing system. In some implementations, the content provider can parse the request to identify the device type for the client device, the application profile corresponding to the application, system configurations of the client device (e.g., display size, resolution, network bandwidth, etc.), and content slot size for the content item, among other data. Based on the request, the content provider can calculate the parameter values to provide to the data processing system for the client device.

In some implementations, the content provider can determine a conditional sequence of values as the parameter values to provide to the data processing system. The conditional sequence of values can specify the parameter value to use for the first information resource and then subsequent resources accessed by the client device. In some implementations, the conditional sequence may specify one parameter value for a second information resource based on selection of the content provider on a first information resource and specify another parameter value for the second information resource based on non-selection of the content provider on the first information. The use of the parameter value in selecting the content item to insert onto the first information resource is detailed below. Once the parameter values are gathered from each of the content providers, the data processing system can insert the received parameter values into the parameter value retrieval script.

Within the parameter value retrieval script, the data processing system can generate the wrapper. Each generated wrapper may correspond to one of the content providers. Each wrapper may correspond to a subroutine or a subfunction (e.g., in the form of JAVASCRIPT) of the parameter value script for retrieving or providing the parameter value to the parameter value retrieval script. In some implementations, each wrapper may include an address for retrieving the parameter value. The address may include a hostname corresponding to the content provider and a file pathname corresponding to the specific parameter value of the content provider for the client device. In some implementations, the wrappers of the parameter value retrieval script may be pre-loaded with the parameter values. In some implementations, the wrappers may include an address of the respective content providers for retrieving the parameter values.

Having generated the parameter value retrieval script, the data processing system can transmit the parameter value retrieval script to the client device. Once received by the application of the client, the application can insert the parameter value retrieval script into the header and can execute the parameter value retrieval script. The execution of the parameter value retrieval script may be prior to the remainder of the information resource, such as the body and other content objects of the information resource. In some implementations, the wrappers may be invoked prior to the parameter value retrieval script, or vice-versa.

The parameter value retrieval script can use the one or more parameter values to select one of the content providers for insertion of content item into the body of the information resource. The parameter value retrieval script can invoke each of the wrappers to retrieve or obtain the parameter values for selection of the content provider. In some implementations, upon invocation, each wrapper can send a request for content selection parameter value to the corresponding content provider. The request for the selection parameter value can include the session identifier. Using the session identifier, each content provider can provide the parameter value. Subsequently, each wrapper can receive the parameter value from the respective content provider. In some implementations, each wrapper may be pre-loaded with the parameter value and may provide the parameter value upon invocation by the parameter value retrieval script.

With the parameter values obtained from the one or more wrappers, the parameter value retrieval script can execute a content selection process to identify which content provider to select. In some implementations, the content selection process can include a header bidding technique. In some implementations, in running the content selection process, the parameter value retrieval script can identify the highest parameter value out of the parameter values received from the content providers. The parameter value retrieval script can then select the content provider corresponding to the highest parameter value. In some implementations, in running the content selection process, the parameter value retrieval script can calculate a combined selection value for each content provider using the respective parameter values. The combined selection value may correspond to one of the content providers, and may be a function of the numeric bid value, the interaction rate, the relevancy metric, and the one or more keywords of the corresponding parameter value. The parameter value retrieval script can then identify the greatest combined selection value. The parameter value retrieval script can then select the content provider corresponding to the greatest combined selection value for identifying which content provider to request the content item from to insert into the information resource.

Upon selecting one of the content providers, the parameter value retrieval script can transmit a request for content to the content provider to insert a content item onto the first information resource. The request for content may include the application profile corresponding to the application, system configurations of the client device (e.g., display size, resolution, network bandwidth, etc.), and content slot size, among others. Based on the request for content, the content provider can identify the content item to provide to the application of the client. Each content provider may have multiple content items to select one content item. Once selected, the content provider can transmit the content item to the client device. The application of the client device can in turn receive the content item, and can insert the content item into the body of the information resource or some other location in the remainder of the information resource subsequent to the header.

At step 410, the data processing system can subsequently receive, from the client device, a second request for second instructions to insert into a second header of a second information resource for selecting one of the plurality of content providers. The second request can include the session identifier. On the other hand, if the client device has previously accessed any of the information resources of the content publisher, the data processing system can generate and provide a content retrieval script.

At step 415, the data processing system can determine that the second request includes the session identifier that matches the session identifier generated responsive to receiving the first request. In some implementations, the data processing system can receive the request for instructions from the client device, subsequent to providing the parameter value retrieval script to the client device. In some implementations, the subsequent request for instructions can include the session identifier previously generated for the client device. As the client device had previously accessed any of the information resources of the content publisher, the information resource on the client device may correspond to or be referred to a second information resource or a subsequent information resource. For the subsequent request, the data processing system may run the content selection process for the second information resource, instead of the client device as was for the first information resource.

At step 420, the data processing system can obtain, responsive to determining that the second request includes the session identifier, a respective content selection parameter value for each content provider of the plurality of content providers using the session identifier. To generate a content retrieval script, the data processing system can parse the subsequent request from the client device to identify the session identifier. The content retrieval script can include a content retriever and a content item identifier. The functionality of the content retrieval script is detailed below. The subsequent request for instructions may or may not include the session identifier. In some implementations, the subsequent request for instructions may include the address, the device identifier, the device type, and the application profile, among other data. Based on the subsequent request for instructions, the data processing system can identify session identifier for the client device. In some implementations, using the address, the device identifier, the device type, and the application profile included in the request, the data processing system can access the database to identify the session identifier 104. As discussed above, the session identifier may be stored and maintained on the database, and may be indexed by the data from the previous request. In some implementations, the data processing system can parse the subsequent request to determine a presence of the session identifier to determine whether the session identifier is included in the request.

Once the session identifier is identified from the request, the data processing system can obtain the parameter values for each of the content providers. In some implementations, the parameter values may have been previously obtained in response to the previous request for instructions. In some implementations, the parameter values may differ from the previous parameter values obtained for the parameter value retrieval script. In some implementations, the data processing system can transmit a request for content selection parameter values to the content providers. The data processing system can identify which content providers to provide the session identifier. In some implementations, the content providers to which to provide the session identifier may be identified based on the content provider identifiers included in the request for instructions from the client device. In some implementations, the content providers to which to provide the session identifier may be identified based on the content publisher. The data processing system can access the database to identify which content providers the content publisher has permitted to insert content items into the information resources of the content publisher. The data processing system can also send a request to the content publisher to identify the content providers that the content publisher has permitted to insert the content items into the information resources. Once the content providers are identified, the data processing system can transmit or send the session identifier to the one or more content providers.

Upon receipt of the session identifier, each content provider can identify the parameter value to provide to the data processing system. The content provider can identify the parameter value based on the session identifier. In some implementations, the content provider can access a database to find the parameter value associated with the session identifier and/or the content provider. In some implementations, the parameter value may differ among the information resources of the content publisher. Having identifier the parameter value using the session identifier, the content provider can return and send the parameter value to the data processing system. In this manner, the client device may no longer have to send separate requests to each of the content providers for parameter values, thereby reducing latency in the network and consumption of computing resources at the client device.

At step 425, the data processing system can select a content provider from the plurality of content providers using the plurality of content selection parameter values obtained from the plurality of content providers. With the parameter values obtained for the content providers, the data processing system can execute a content selection process to identify which content provider to select. In some implementations, in running the content selection process, the data processing system can identify the highest parameter value out of the parameter values received from the content providers. The data processing system can then identify and select the content provider corresponding to the highest parameter value. In some implementations, in running the content selection process, the data processing system can calculate a combined selection value for each content provider using the respective parameter values. The combined selection value may correspond to one of the content providers, and may be a function of the numeric bid value, the interaction rate, the relevancy metric, and the one or more keywords of the corresponding parameter value. The data processing system can then identify the greatest combined selection value. The data processing system can then select the content provider corresponding to the greatest combined selection value for identifying which content provider to request the content item from to insert into the information resource. In this manner, the client device may no longer have to run the content selection process using parameter values of the content providers, thereby lowering consumption of computing resources at the client device.

In some implementations, the data processing system can use the conditional sequence of values to run the content selection process. As discussed above, the conditional sequence may specify a first parameter value for a second information resource based on selection of the content provider on a first information resource and may specify a second parameter value for the second information resource based on non-selection of the content provider on the first information resource. The data processing system can identify which content provider was selected for the first information resource. Based on which content provider was selected, the data processing system can select the parameter value to use in the content selection process as specified in the conditional sequence. If the content provider was not selected in the first information resource, the data processing system can identify the second parameter value for use in the content selection process for the content provider. If the content provider was selected in the first information resource, the data processing system can identify the first parameter value for use in the content selection process for the content provider. The content selection process used in conjunction with the conditional sequence may be the same as described above.

In some implementations, the data processing system can use parameter values directly provided by the content providers, as opposed to the conditional sequence retrieved previously. The parameter values may be dynamic, and may have changed since the information resource was accessed by the client device. The data processing system can generate a random value using a pseudo-number generator. Based on the random value, the data processing system can use the parameter value from the content provider, instead of the conditional sequence. In some implementations, the data processing system can compare the random value to a first range for using the parameter value to a second range for using the conditional sequence. If the random value is within the first range, the data processing system can send a request to each content provider for a new parameter value. If the random value is within the second range, the data processing system can proceed to use the conditional sequence previously received from each of the content providers. In this manner, the content provider can compare interaction statistics with the content items inserted onto the information resources when new parameter values are used versus when the conditional sequence is used in the content selection process.

At step 430, the data processing system can provide a content retrieval script to the client device to insert into the second header of the second information resource. The content retrieval script can be configured to cause the client device to obtain a content item from the selected content provider to insert into the second information resource.

Upon selecting one of the content providers, the data processing system can transmit a request for content to the content provider for inserting a content item onto the information resource. The request for content may include the application profile corresponding to the application, system configurations of the client device (e.g., display size, resolution, network bandwidth, etc.), and content slot size, among others. Based on the request for content, the content provider can identify the content item to provide to the application of the client. Each content provider may have multiple content items to select one content item. Once selected, the content provider can transmit a content item identifier corresponding to the content item to the data processing system. The content item identifier may be a Universal Resource Locator (URL), and may include a protocol, a hostname corresponding to the selected content provider, and a file pathname corresponding to the specific content item to be inserted into the information resource, among other parameters. The data processing system can insert the content item identifier into the content retrieval script. The data processing system can in turn transmit the content retrieval script to the application of the client device.

Once received by the application of the client, the application can insert the content retrieval script into the header and can execute the parameter content retrieval script. In some implementations, the application can execute the content retriever. The execution of the content retrieval script may be prior to the remainder of the information resource, such as the body and other content objects of the information resource. The content retriever can transmit a request for content to the content provider specified in the content item identifier. The request for content can include the content item identifier. Upon receipt of the request for content from the content retriever, the recipient content provider can identify the content item to be provided to the client device. Once identifier, the content provider can transmit the content item to the client device. The application of the client device can receive the content item. The content retriever can insert the content item into the body of the information resource or some other location in the remainder of the information resource subsequent to the header.

In some implementations, the data processing system can provide the parameter value retrieval script for subsequent information resources after providing the content retrieval script, regardless of whether the client device has previously accessed at least one information resource of the content publisher. The data processing system can generate a random value using a pseudo-number generator. Based on the random value, the data processing system can provide the parameter value retrieval script, instead of the content retrieval script. In some implementations, the data processing system can compare the random value to a first range for providing the parameter value retrieval script or to a second range for providing the content retrieval script. If the random value is within the first range, the data processing system can provide the application of the client device the parameter value retrieval script. If the random value is within the second range, the data processing system can provide the application of the client device the content retrieval script. In this manner, the content provider can compare interaction statistics with the content items inserted onto the information resources with the parameter value retrieval script and with the content retrieval script.

FIG. 5 shows the general architecture of an illustrative computer system 500 that may be employed to implement any of the computer systems discussed herein (including the data processing system 110 and its components, script provider 130, the identifier generator 132, the parameter aggregator 134, the provider selector 136, and the database 138, and the client device 125 and its components, the application 160, the script requestor 166, the parameter value retrieve script 205, and the content retrieval script 220) in accordance with some implementations. The computer system 500 can be used to provide information via the network 105 for display. The computer system 500 of FIG. 5 comprises one or more processors 520 communicatively coupled to memory 525, one or more communications interfaces 505, and one or more output devices 510 (e.g., one or more display units) and one or more input devices 515. The processors 520 can be included in the data processing system 110 or the other components of the data processing system 110. The processors 520 can be included in the content publisher 115 or the other components of the content publisher 115. The processors 520 can be included in the content provider 120A-N or the other components of the content provider 120A-N. The processors 520 can be included in the client device 125 or the other components of the client device 125.

In the computer system 500 of FIG. 5, the memory 525 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 100 of FIG. 1, the data processing system 110 can include the memory 525 to store information related to the availability of inventory of one or more content units, reservations of one or more content units, among others. The memory 525 can include the database 138. The processor(s) 520 shown in FIG. 5 may be used to execute instructions stored in the memory 525 and, in so doing, also may read from or write to the memory various information processed and or generated pursuant to execution of the instructions.

The processor 520 of the computer system 500 shown in FIG. 5 also may be communicatively coupled to or made to control the communications interface(s) 505 to transmit or receive various information pursuant to execution of instructions. For example, the communications interface(s) 505 may be coupled to a wired or wireless network, bus, or other communication means and may therefore allow the computer system 500 to transmit information to or receive information from other devices (e.g., other computer systems). While not shown explicitly in the system of FIG. 1 or FIG. 5, one or more communications interfaces facilitate information flow between the components of the system 500. In some implementations, the communications interface(s) may be configured (e.g., via various hardware components or software components) to provide a website as an access portal to at least some aspects of the computer system 500. Examples of communications interfaces 505 include user interfaces (e.g., webpages), through which the user can communicate with the data processing system 110.

The output devices 510 of the computer system 500 shown in FIG. 5 may be provided, for example, to allow various information to be viewed or otherwise perceived in connection with execution of the instructions. The input device(s) 515 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable a receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, or other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In some implementations, the features may be implemented on a laptop computer or other personal computer, a smartphone, other mobile phone, handheld computer, a tablet PC, or other computing device. In some implementations, the features disclosed herein may be implemented on a wearable device or component (e.g., smart watch) which may include a processing module configured to integrate internet connectivity (e.g., with another computing device or the network 105).

The operations described in this specification can be implemented as operations performed by a data processing apparatus on data stored on one or more computer-readable storage devices or on data received from other sources.

The terms "data processing apparatus", "data processing system", "user device" or "computing device" encompasses all kinds of apparatuses, devices, and machines for processing data, including by way of example a programmable processor, a computer, a system on a chip or multiple chips, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The script provider 130, the identifier generator 132, the parameter aggregator 134, and the provider selector 136 can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from read-only memory or random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well. For example, feedback provided to the user can include any form of sensory feedback, e.g., visual feedback, auditory feedback, or tactile feedback, and input from the user can be received in any form, including acoustic, speech, or tactile input. In addition, a computer can interact with a user by sending documents to and receiving documents from a device that is used by the user, for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system such as system 500 or system 100 can include clients and servers. For example, the data processing system 110 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. The script provider 130, the identifier generator 132, the parameter aggregator 134, and the provider selector 136 can be part of the data processing system 110, a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description, or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to maintaining session identifiers across multiple webpages for content selection and deploying countermeasures thereto, the systems and methods described herein can include applied to other environments. The foregoing implementations are illustrative rather than limiting of the described systems and methods. The scope of the systems and methods described herein is thus indicated by the appended claims, rather than the foregoing description, and changes that come within the meaning and range of equivalency of the claims are embraced therein.

What is claimed is:

1. A method, comprising:
   receiving, by a data processing system, from a client device accessing a first information resource having a header and a body, a request for instructions to insert into the header of the first information resource, the request including a session identifier for use in selecting content from one of a plurality of content providers to insert into the body of the first information resource;
   determining, by the data processing system, that the session identifier of the request matches the session identifier that was provided to the plurality of content providers in response to the client device accessing a second information resource prior to the first information resource;
   identifying, by the data processing system, responsive to determining that the request includes the session identifier that was previously provided to the plurality of content providers, a content selection parameter value for a corresponding content provider of the plurality of content providers using the session identifier; and
   providing, by the data processing system to the client device, a script and a plurality of content selection parameter values to insert into the header of the first information resource, the script when executed by the client device configured to cause the client device to:
      select, from the plurality of content providers, a content provider by executing a content selection process using the plurality of content selection parameter values, and
      retrieve a content item from the selected content provider to insert into the body of the first information resource.

2. The method of claim 1, further comprising:
   identifying, by the data processing system, a content provider address corresponding to the content provider selected using the plurality of content selection parameter values obtained from the plurality of content providers;
   generating, by the data processing system, a second script including instructions to cause the client device to obtain the content item using the content provider address; and
   providing, by the data processing system, the second script to the client device, receipt of the second script causing the client device to send a request for content to the content provider address specified in the second script and to subsequently receive the content item from the content provider.

3. The method of claim 1, further comprising:
   determining, by the data processing system, responsive to receiving the request, that the client device has not previously accessed the plurality of information resources of a content publisher; and
   generating, by the data processing system, the session identifier, responsive to determining that the client device has not previously accessed the plurality of information resources.

4. The method of claim 1, further comprising providing, by the data processing system, the session identifier to each content provider of the plurality of content providers, receipt of the session identifier causing the corresponding content provider to:
   store the session identifier as corresponding to the client device for use in providing content to be served across the plurality of information resources of a content publisher; and
   transmit, to the data processing system, a content selection parameter used by the client device to select a corresponding content item to insert into the information resource at the client device.

5. The method of claim 1, further comprising providing, by the data processing system, the script to the client device, receipt of the script causing the client device to:
   insert the script into the header of the information resource;
   execute the header of the information resource including the script prior to execution of a remainder of the information resource; and
   send, in executing the script of the header, a request for content to the selected content provider to obtain the content item.

6. The method of claim 1, wherein providing the script further comprises the script to the client device to insert into the header of the information resource, the script configured to permit the corresponding content provider to access state data stored on the client device using the session identifier.

7. The method of claim 1, further comprising obtaining, by the data processing system, a conditional sequence of content selection parameter values for each content provider using the session identifier to insert into the script, the conditional sequence of content selection parameters specifying:
   the respective content selection parameter value for the information resource, and
   one of a second respective content selection parameter based on selection of the corresponding content provider for a third information resource of the content publisher subsequent to the information resource or a third respective content selection parameter based on non-selection of the corresponding content provider for the second information resource.

8. The method of claim 7, further comprising:
   receiving, by the data processing system, subsequent to receiving the request, a second request for instructions to insert into a second header of the third information resource, the second request including the session identifier;
   selecting, by the data processing system, for the second information resource, a second content provider from the plurality of content providers using the conditional sequence of content selection parameter values obtained from the plurality of content providers; and providing, by the data processing system, a second script to the client device to insert into the second header of the third information resource, the second script configured to cause the client device to obtain a second content item from the second content provider to insert into the third information resource.

9. The method of claim 7, further comprising:

receiving, by the data processing system, subsequent to receiving the request, a second request for instructions to insert into a second header of the third information resource, the third request including the session identifier;

determining, by the data processing system, that the conditional sequence of content selection parameter values is not to be used in selecting one of the plurality of content providers for the third information resource;

obtaining, by the data processing system, responsive to determined that the conditional sequence of content selection parameter values is not to be used, a second content selection parameter value for each content provider of the plurality of content providers using the session identifier;

selecting, by the data processing system, one of the content provider or a second content provider from the plurality of content providers using the plurality of second content selection parameter values obtained from the plurality of content providers; and providing, by the data processing system, a second script to the client device to insert into the second header of the third information resource, the second script configured to cause the client device to obtain a second content item to insert into the third information resource.

10. A system, comprising:

a data processing system having one or more processors, configured to:

receive, from a client device accessing a first information resource having a header and a body, a request for instructions to insert into the header of the first information resource, the request including a session identifier for use in selecting content from one of a plurality of content providers to insert into the body of the first information resource;

determine that the session identifier of the request matches the session identifier that was provided to the plurality of content providers in response to the client device accessing a second information resource prior to the first information resource;

identify, responsive to determining that the request includes the session identifier that was previously provided to the plurality of content providers, a content selection parameter value for a corresponding content provider of the plurality of content providers using the session identifier; and provide, to the client device a script and a plurality of content selection parameter values to insert into the header of the first information resource, the content retrieval script when executed by the client device configured to cause the client device to:

select, from the plurality of content providers, a content provider by executing a content selection process using the plurality of content selection parameter values, and retrieve a content item from the selected content provider to insert into the body of the first information resource.

11. The system of claim 10, wherein the data processing system is further configured to:

identify a content provider address corresponding to the content provider selected using the plurality of content selection parameter values obtained from the plurality of content providers;

generate a second script including instructions to cause the client device to obtain the content item using the content provider address; and provide the second script to the client device, receipt of the second script causing the client device to send a request for content to the content provider address specified in the second script and to subsequently receive the content item from the content provider.

12. The system of claim 10, wherein the data processing system is further configured to:

determine, responsive to receiving the request, that the client device has not previously accessed the plurality of information resources of a content publisher; and generate the session identifier, responsive to determining that the client device has not previously accessed the plurality of information resources.

13. The system of claim 10, wherein the data processing system is further configured to provide the session identifier to each content provider of the plurality of content providers, receipt of the session identifier causing the corresponding content provider to:

store the session identifier as corresponding to the client device for use in providing content to be served across the plurality of information resources of a content publisher; and transmit, to the parameter aggregator, a content selection parameter used by the client device to select a corresponding content item to insert into the information resource at the client device.

14. The system of claim 10, wherein the data processing system is further configured to provide the script to the client device, receipt of the script causing the client device to:

insert the script into the header of the information resource;

execute the header of the information resource including the script prior to execution of a remainder of the information resource; and send, in executing the script of the header, a request for content to the selected content provider to obtain the content item.

15. The system of claim 10, wherein the data processing system is further configured to:

provide the script to the client device to insert into the header of the information resource, the script configured to permit the corresponding content provider to access state data stored on the client device using the session identifier.

16. The system of claim 10, wherein the data processing system is further configured to obtain a conditional sequence of content selection parameter values for each content provider using the session identifier, the conditional sequence of content selection parameters specifying:

the respective content selection parameter value for the information resource, and one of a second respective content selection parameter based on selection of the corresponding content provider for a third information resource of the content publisher subsequent to the information resource or a third respective content selection parameter based on non-selection of the corresponding content provider for the third information resource.

17. The system of claim 16, wherein the data processing system is further configured to:
- receive, subsequent to receiving the request, a second request for instructions to insert into a second header of a third information resource, the second request including the session identifier;
- select, for the third information resource, a second content provider from the plurality of content providers using the conditional sequence of content selection parameter values obtained from the plurality of content providers; and
- provide a second script to the client device to insert into the second header of the third information resource, the second script configured to cause the client device to obtain a second content item from the second content provider to insert into the third information resource.

18. The system of claim 16, wherein the data processing system is further configured to:
- receive, subsequent to receiving the request, a second request for instructions to insert into a second header of the third information resource, the second request including the session identifier;
- determine that the conditional sequence of content selection parameter values is not to be used in selecting one of the plurality of content providers for the third information resource, and
- obtain, responsive to determined that the conditional sequence of content selection parameter values is not to be used, a second content selection parameter value for each content provider of the plurality of content providers using the session identifier;
- select one of the content provider or a second content provider from the plurality of content providers using the plurality of second content selection parameter values obtained from the plurality of content providers; and
- provide a second script to the client device to insert into the second header of the third information resource, the script configured to cause the client device to obtain a second content item to insert into the third information resource.

* * * * *